(12) United States Patent
Sisk et al.

(10) Patent No.: US 7,654,735 B2
(45) Date of Patent: Feb. 2, 2010

(54) ELECTRONIC THERMOMETER

(75) Inventors: Ricky A. Sisk, Washington, MO (US); Kenneth M. Breitweiser, Brighton, IL (US); Joseph T. Gierer, Glen Carbon, IL (US); Scott Kimsey, Hebron, KY (US)

(73) Assignee: Covidien AG (CH)

( * ) Notice: Subject to any disclaimer, the term of this patent is extended or adjusted under 35 U.S.C. 154(b) by 287 days.

(21) Appl. No.: 11/539,516

(22) Filed: Oct. 6, 2006

(65) Prior Publication Data

US 2007/0110122 A1    May 17, 2007

Related U.S. Application Data

(63) Continuation-in-part of application No. 29/241,955, filed on Nov. 3, 2005, now Pat. No. Des. 535,202.

(51) Int. Cl.
*G01K 13/00* (2006.01)

(52) U.S. Cl. ..................................................... 374/100

(58) Field of Classification Search ................. 374/208, 374/163, 102, 100
See application file for complete search history.

(56) References Cited

U.S. PATENT DOCUMENTS

| | | |
|---|---|---|
| 1,115,561 A | 11/1914 | Northey |
| 1,436,707 A | 11/1922 | Gaschke |
| 1,518,531 A | 12/1924 | Lung |
| 2,219,605 A | 10/1940 | Turkel |
| 2,854,976 A | 10/1958 | Heydrich |
| 3,254,533 A | 6/1966 | Tongret |
| 3,539,034 A | 11/1970 | Tafeen |
| 3,610,240 A | 10/1971 | Harautuneian |
| 3,681,991 A | 8/1972 | Eberly, Jr. |
| 3,729,998 A | 5/1973 | Mueller et al. |
| 3,822,598 A | 7/1974 | Brothers et al. |
| 3,884,230 A | 5/1975 | Wulff |
| 3,890,971 A | 6/1975 | Leeson et al. |
| 3,893,058 A | 7/1975 | Keith |
| 3,893,445 A | 7/1975 | Hofsess |
| 3,904,033 A | 9/1975 | Haerr |
| 3,915,003 A | 10/1975 | Adams |
| 3,946,613 A | 3/1976 | Silver |

(Continued)

FOREIGN PATENT DOCUMENTS

DE    3805567 A1    8/1989

(Continued)

OTHER PUBLICATIONS

Extended European Search Report, Application No. 07117902.2, dated May 21, 2008, 8 pages.

(Continued)

*Primary Examiner*—Andre J Allen

(57) ABSTRACT

An electronic thermometer having ergonomic and efficiency features. The thermometer includes a display and a control panel, defined by at least one button, disposed above the display. The thermometer is easy and comfortable to hold and allows the user to operate the thermometer with one hand. The thermometer holds a probe and a container of probe covers in a convenient and compact configuration. A battery door is particularly constructed to avoid accidental opening. A bottom of the thermometer is formed to hold the housing in an upright position when the bottom is placed one a horizontal surface.

40 Claims, 21 Drawing Sheets

U.S. PATENT DOCUMENTS

| | | |
|---|---|---|
| 3,976,070 A | 8/1976 | Dumont |
| 4,008,614 A | 2/1977 | Turner et al. |
| 4,010,737 A | 3/1977 | Vilaghy |
| 4,026,287 A | 5/1977 | Haller |
| 4,099,518 A | 7/1978 | Baylis |
| D249,475 S | 9/1978 | Turner et al. |
| 4,112,762 A | 9/1978 | Turner et al. |
| 4,139,009 A | 2/1979 | Alvarez |
| 4,142,517 A | 3/1979 | Contreras Guerrero de Stavropoulos et al. |
| 4,143,853 A | 3/1979 | Abramson |
| 4,160,450 A | 7/1979 | Doherty |
| 4,163,446 A | 8/1979 | Jamshidi |
| 4,177,797 A | 12/1979 | Baylis |
| 4,183,248 A | 1/1980 | West |
| D254,723 S | 4/1980 | Lawrence et al. |
| D255,997 S | 7/1980 | Maeda |
| 4,211,214 A | 7/1980 | Chikashige |
| 4,256,119 A | 3/1981 | Gauthier |
| 4,258,713 A | 3/1981 | Wardlaw |
| 4,258,722 A | 3/1981 | Sessions et al. |
| 4,262,676 A | 4/1981 | Jamshidi |
| 4,266,543 A | 5/1981 | Blum |
| 4,266,555 A | 5/1981 | Jamshidi |
| 4,314,565 A | 2/1982 | Lee |
| 4,356,828 A | 11/1982 | Jamshidi |
| 4,392,859 A | 7/1983 | Dent |
| 4,403,617 A | 9/1983 | Tretinyak |
| 4,425,120 A | 1/1984 | Sampson |
| 4,438,884 A | 3/1984 | O'Brien et al. |
| 4,469,109 A | 9/1984 | Mehl |
| 4,482,348 A | 11/1984 | Dent |
| 4,487,209 A | 12/1984 | Mehl |
| 4,513,754 A | 4/1985 | Lee |
| 4,543,966 A | 10/1985 | Islam |
| 4,572,365 A | 2/1986 | Bruno et al. |
| 4,573,976 A | 3/1986 | Sampson |
| 4,613,329 A | 9/1986 | Bodicky |
| 4,619,271 A | 10/1986 | Burger et al. |
| 4,630,616 A | 12/1986 | Tretinyak |
| 4,631,057 A | 12/1986 | Mitchell |
| 4,639,249 A | 1/1987 | Larson |
| 4,642,785 A * | 2/1987 | Packard et al. .............. 702/131 |
| 4,643,199 A | 2/1987 | Jennings |
| 4,643,200 A | 2/1987 | Jennings |
| 4,655,226 A | 4/1987 | Lee |
| 4,664,654 A | 5/1987 | Strauss |
| 4,676,783 A | 6/1987 | Jagger et al. |
| 4,681,567 A | 7/1987 | Masters |
| 4,693,708 A | 9/1987 | Wanderer |
| 4,695,274 A | 9/1987 | Fox |
| D292,493 S | 10/1987 | King |
| D292,494 S | 10/1987 | King |
| D293,215 S | 12/1987 | Bruno et al. |
| 4,723,943 A | 2/1988 | Spencer |
| 4,725,267 A | 2/1988 | Vaillancourt |
| 4,728,320 A | 3/1988 | Chen |
| 4,735,619 A | 4/1988 | Sperry |
| 4,737,144 A | 4/1988 | Choksi |
| 4,738,663 A | 4/1988 | Bogan |
| 4,741,627 A | 5/1988 | Fukui et al. |
| 4,743,233 A | 5/1988 | Schneider |
| 4,747,831 A | 5/1988 | Kulli |
| 4,747,836 A | 5/1988 | Luther |
| 4,747,837 A | 5/1988 | Hauck |
| 4,752,290 A | 6/1988 | Schramm |
| 4,762,516 A | 8/1988 | Luther |
| 4,770,655 A | 9/1988 | Haber et al. |
| 4,772,272 A | 9/1988 | McFarland |
| 4,775,363 A | 10/1988 | Sandsdalen |
| 4,781,684 A | 11/1988 | Trenner |
| 4,781,692 A | 11/1988 | Jagger et al. |
| 4,785,826 A | 11/1988 | Ward |
| 4,790,329 A | 12/1988 | Simon |
| 4,790,827 A | 12/1988 | Haber et al. |
| 4,790,828 A | 12/1988 | Dombrowski |
| 4,793,363 A | 12/1988 | Ausherman |
| 4,795,432 A | 1/1989 | Karczmer |
| 4,804,371 A | 2/1989 | Vaillancourt |
| 4,804,372 A | 2/1989 | Laico |
| 4,810,248 A | 3/1989 | Masters |
| 4,813,426 A | 3/1989 | Haber et al. |
| 4,816,022 A | 3/1989 | Poncy |
| D300,728 S | 4/1989 | Ross |
| 4,819,659 A | 4/1989 | Sitar |
| 4,820,275 A | 4/1989 | Haber et al. |
| 4,826,488 A | 5/1989 | Nelson |
| 4,826,490 A | 5/1989 | Byrne et al. |
| 4,826,491 A | 5/1989 | Schramm |
| 4,834,718 A | 5/1989 | McDonald |
| 4,838,280 A | 6/1989 | Haaga |
| 4,838,282 A | 6/1989 | Strasser |
| 4,842,586 A | 6/1989 | Hogan |
| 4,846,809 A | 7/1989 | Sims |
| 4,900,307 A | 2/1990 | Kulli |
| 4,904,242 A | 2/1990 | Kulli |
| 4,906,235 A | 3/1990 | Roberts |
| 4,909,793 A | 3/1990 | Vining |
| 4,911,694 A | 3/1990 | Dolan |
| 4,911,706 A | 3/1990 | Levitt |
| 4,915,702 A | 4/1990 | Haber |
| D307,558 S | 5/1990 | Messina et al. |
| 4,922,602 A | 5/1990 | Mehl |
| 4,927,414 A | 5/1990 | Kulli |
| 4,929,241 A | 5/1990 | Kulli |
| 4,931,044 A | 6/1990 | Beiter |
| 4,935,013 A | 6/1990 | Haber et al. |
| 4,943,283 A | 7/1990 | Hogan |
| 4,944,725 A | 7/1990 | McDonald |
| 4,950,250 A | 8/1990 | Haber |
| 4,952,207 A | 8/1990 | Lemieux |
| 4,955,866 A | 9/1990 | Corey |
| 4,958,625 A | 9/1990 | Bates et al. |
| 4,960,412 A | 10/1990 | Fink |
| 4,964,854 A | 10/1990 | Luther |
| 4,966,587 A | 10/1990 | Baumgart |
| 4,969,554 A | 11/1990 | Sawaya |
| 4,978,344 A | 12/1990 | Dombrowski |
| 4,986,279 A | 1/1991 | O'Neill |
| 4,994,041 A | 2/1991 | Dombrowski |
| 5,005,585 A | 4/1991 | Mazza |
| 5,012,818 A | 5/1991 | Joishy |
| 5,013,304 A | 5/1991 | Russell et al. |
| 5,031,634 A | 7/1991 | Simon |
| 5,036,860 A | 8/1991 | Leigh et al. |
| 5,047,044 A | 9/1991 | Smith et al. |
| 5,049,136 A | 9/1991 | Johnson |
| 5,051,109 A | 9/1991 | Simon |
| 5,053,017 A | 10/1991 | Chamuel |
| 5,057,085 A | 10/1991 | Kopans |
| 5,059,180 A | 10/1991 | McLees |
| 5,085,648 A | 2/1992 | Purdy et al. |
| 5,092,851 A | 3/1992 | Ragner |
| 5,102,394 A | 4/1992 | Lasaitis |
| 5,108,374 A | 4/1992 | Lemieux |
| 5,126,090 A | 6/1992 | Egolf et al. |
| 5,127,916 A | 7/1992 | Spencer |
| 5,133,727 A | 7/1992 | Bales et al. |
| 5,135,504 A | 8/1992 | McLees |
| 5,147,327 A | 9/1992 | Johnson |
| 5,154,703 A | 10/1992 | Bonaldo |
| 5,171,229 A | 12/1992 | McNeil et al. |
| 5,172,702 A | 12/1992 | Leigh et al. |
| 5,176,256 A | 1/1993 | Sawaya |

| | | | | | |
|---|---|---|---|---|---|
| 5,183,468 A | 2/1993 | McLees | 5,482,054 A | 1/1996 | Slater et al. |
| 5,195,533 A | 3/1993 | Chin | 5,487,734 A | 1/1996 | Thorne |
| 5,195,985 A | 3/1993 | Hall | 5,492,532 A | 2/1996 | Ryan |
| 5,213,115 A | 5/1993 | Zytkovicz et al. | 5,501,675 A | 3/1996 | Erskine |
| 5,215,525 A | 6/1993 | Sturman | 5,507,296 A | 4/1996 | Bales et al. |
| 5,215,528 A | 6/1993 | Purdy et al. | 5,507,297 A | 4/1996 | Slater et al. |
| 5,215,533 A | 6/1993 | Robb | 5,507,298 A | 4/1996 | Schramm et al. |
| 5,217,438 A | 6/1993 | Davis | 5,514,100 A | 5/1996 | Mahurkar |
| 5,228,451 A | 7/1993 | Bales et al. | 5,514,152 A | 5/1996 | Smith |
| 5,256,149 A | 10/1993 | Banik | 5,522,398 A | 6/1996 | Goldenberg |
| 5,257,632 A | 11/1993 | Turkel et al. | 5,526,821 A | 6/1996 | Jamshidi |
| 5,279,306 A | 1/1994 | Mehl | 5,533,516 A | 7/1996 | Sahatjian |
| 5,279,563 A | 1/1994 | Brucker et al. | 5,533,974 A | 7/1996 | Gaba |
| 5,279,591 A | 1/1994 | Simon | 5,538,009 A | 7/1996 | Byrne et al. |
| 5,282,477 A | 2/1994 | Bauer | 5,542,927 A | 8/1996 | Thorne |
| 5,295,977 A | 3/1994 | Cohen et al. | 5,549,565 A | 8/1996 | Ryan et al. |
| 5,304,136 A | 4/1994 | Erskine | 5,549,708 A | 8/1996 | Thorne et al. |
| 5,312,359 A | 5/1994 | Wallace | 5,553,624 A | 9/1996 | Francese |
| 5,314,406 A | 5/1994 | Arias et al. | 5,558,651 A | 9/1996 | Crawford et al. |
| 5,316,013 A | 5/1994 | Striebel et al. | 5,562,629 A | 10/1996 | Haughton |
| 5,320,635 A | 6/1994 | Smith | 5,562,633 A | 10/1996 | Wozencroft |
| 5,322,517 A | 6/1994 | Sircom et al. | 5,562,683 A | 10/1996 | Chan |
| 5,324,288 A | 6/1994 | Billings et al. | 5,569,217 A | 10/1996 | Luther |
| 5,328,482 A | 7/1994 | Sircom et al. | 5,569,299 A | 10/1996 | Dill |
| 5,331,971 A | 7/1994 | Bales et al. | 5,570,783 A | 11/1996 | Thorne et al. |
| 5,331,972 A | 7/1994 | Wadhwani | 5,573,008 A | 11/1996 | Robinson |
| 5,334,158 A | 8/1994 | McLees | 5,573,510 A | 11/1996 | Isaacson |
| 5,338,311 A | 8/1994 | Mahurkar | 5,578,015 A | 11/1996 | Robb |
| 5,338,314 A | 8/1994 | Ryan | 5,584,809 A | 12/1996 | Gaba |
| 5,341,816 A | 8/1994 | Allen | 5,584,810 A | 12/1996 | Brimhall |
| 5,344,408 A | 9/1994 | Partika | 5,584,818 A | 12/1996 | Morrison |
| 5,348,022 A | 9/1994 | Leigh | 5,586,990 A | 12/1996 | Hahnen et al. |
| 5,348,544 A | 9/1994 | Sweeney et al. | 5,591,202 A | 1/1997 | Slater et al. |
| 5,356,421 A | 10/1994 | Castro | 5,595,186 A | 1/1997 | Rubinstein et al. |
| 5,357,974 A | 10/1994 | Baldridge | 5,599,310 A | 2/1997 | Bogert |
| 5,368,045 A | 11/1994 | Clement et al. | 5,601,536 A | 2/1997 | Crawford et al. |
| 5,368,046 A | 11/1994 | Scarfone et al. | 5,601,585 A | 2/1997 | Banik |
| 5,370,623 A | 12/1994 | Kreamer | 5,601,599 A | 2/1997 | Nunez |
| D354,921 S | 1/1995 | Narayanan | 5,611,781 A | 3/1997 | Sircom et al. |
| 5,385,151 A | 1/1995 | Scarfone | 5,615,690 A | 4/1997 | Giurtino et al. |
| 5,385,570 A | 1/1995 | Chin | 5,616,135 A | 4/1997 | Thorne et al. |
| 5,389,104 A | 2/1995 | Hahnen et al. | 5,623,969 A | 4/1997 | Raines |
| 5,389,106 A | 2/1995 | Tower | 5,624,459 A | 4/1997 | Kortenbach |
| 5,394,885 A | 3/1995 | Francese | 5,630,506 A | 5/1997 | Thorne et al. |
| 5,395,375 A | 3/1995 | Turkel | 5,630,837 A | 5/1997 | Crowley |
| 5,396,900 A | 3/1995 | Slater et al. | 5,632,555 A | 5/1997 | Gregory et al. |
| 5,399,167 A | 3/1995 | Deniega | 5,634,473 A | 6/1997 | Goldenberg |
| 5,403,283 A | 4/1995 | Luther | 5,643,307 A | 7/1997 | Turkel |
| 5,405,323 A | 4/1995 | Rogers et al. | 5,656,031 A | 8/1997 | Thorne |
| 5,405,388 A | 4/1995 | Fox | 5,662,610 A | 9/1997 | Sircom |
| 5,409,461 A | 4/1995 | Steinman | 5,666,965 A | 9/1997 | Bales et al. |
| 5,411,486 A | 5/1995 | Zadini | 5,669,883 A | 9/1997 | Scarfone |
| 5,415,182 A | 5/1995 | Chin | 5,672,161 A | 9/1997 | Allen |
| 5,417,659 A | 5/1995 | Gaba | 5,679,907 A | 10/1997 | Ruck |
| 5,417,709 A | 5/1995 | Slater | 5,685,852 A | 11/1997 | Turkel |
| 5,419,766 A | 5/1995 | Chang et al. | 5,685,862 A | 11/1997 | Mahurkar |
| 5,421,522 A | 6/1995 | Bowen | 5,687,907 A | 11/1997 | Holden |
| 5,423,766 A | 6/1995 | Di Cesare | 5,690,619 A | 11/1997 | Erskine |
| 5,425,718 A | 6/1995 | Tay | 5,693,022 A | 12/1997 | Haynes |
| 5,425,884 A | 6/1995 | Botz | 5,693,031 A | 12/1997 | Ryan et al. |
| 5,429,138 A | 7/1995 | Jamshidi | 5,695,467 A | 12/1997 | Miyata et al. |
| 5,429,616 A | 7/1995 | Schaffer | 5,695,521 A | 12/1997 | Anderhub |
| 5,454,378 A | 10/1995 | Palmer et al. | 5,697,904 A | 12/1997 | Raines |
| 5,456,267 A | 10/1995 | Stark | 5,697,907 A | 12/1997 | Gaba |
| 5,458,658 A | 10/1995 | Sircom | 5,700,249 A | 12/1997 | Jenkins |
| 5,462,062 A | 10/1995 | Rubinstein | 5,700,250 A | 12/1997 | Erskine |
| 5,466,223 A | 11/1995 | Bressler et al. | 5,702,080 A | 12/1997 | Whittier et al. |
| 5,471,992 A | 12/1995 | Banik | 5,702,369 A | 12/1997 | Mercereau |
| 5,473,629 A | 12/1995 | Muramoto | 5,706,824 A | 1/1998 | Whittier |
| 5,476,099 A | 12/1995 | Robinson et al. | 5,707,392 A | 1/1998 | Kortenbach |
| 5,476,102 A | 12/1995 | Como | 5,713,368 A | 2/1998 | Leigh |
| 5,478,313 A | 12/1995 | White | 5,713,888 A | 2/1998 | Neuenfeldt |
| 5,480,385 A | 1/1996 | Thorne et al. | 5,715,832 A | 2/1998 | Koblish et al. |

| | | |
|---|---|---|
| 5,718,688 A | 2/1998 | Wozencroft |
| 5,722,422 A | 3/1998 | Palmer |
| 5,730,150 A | 3/1998 | Peppel |
| 5,730,724 A | 3/1998 | Plishka |
| 5,735,827 A | 4/1998 | Adwers |
| 5,738,660 A | 4/1998 | Luther |
| 5,738,665 A | 4/1998 | Caizza |
| 5,746,753 A | 5/1998 | Sullivan |
| 5,752,923 A | 5/1998 | Terwilliger |
| D395,609 S | 6/1998 | Knieriem et al. |
| 5,758,655 A | 6/1998 | Como Rodriguez et al. |
| 5,776,157 A | 7/1998 | Thorne et al. |
| 5,795,336 A | 8/1998 | Romano et al. |
| 5,807,275 A | 9/1998 | Jamshidi |
| 5,807,277 A | 9/1998 | Swaim |
| 5,810,744 A | 9/1998 | Chu |
| 5,817,069 A | 10/1998 | Arnett |
| 5,823,970 A | 10/1998 | Terwilliger |
| 5,823,971 A | 10/1998 | Robinson |
| 5,823,997 A | 10/1998 | Thorne |
| 5,824,002 A | 10/1998 | Gentelia et al. |
| D400,806 S | 11/1998 | Tillack |
| D400,808 S | 11/1998 | Schwan |
| 5,836,917 A | 11/1998 | Thorne |
| 5,836,921 A | 11/1998 | Mahurkar |
| 5,840,044 A | 11/1998 | Dassa |
| 5,843,001 A | 12/1998 | Goldenberg |
| 5,848,692 A | 12/1998 | Thorne et al. |
| 5,853,393 A | 12/1998 | Bogert |
| 5,860,955 A | 1/1999 | Wright |
| 5,865,806 A | 2/1999 | Howell |
| 5,871,453 A | 2/1999 | Banik et al. |
| 5,873,886 A | 2/1999 | Larsen et al. |
| 5,879,332 A | 3/1999 | Schwemberger et al. |
| 5,879,337 A | 3/1999 | Kuracina et al. |
| 5,879,338 A | 3/1999 | Mahurkar |
| 5,882,337 A | 3/1999 | Bogert et al. |
| 5,885,226 A | 3/1999 | Rubinstein |
| 5,891,105 A | 4/1999 | Mahurkar |
| 5,893,845 A | 4/1999 | Newby |
| 5,893,876 A | 4/1999 | Turkel |
| 5,895,361 A | 4/1999 | Turturro |
| 5,897,507 A | 4/1999 | Kortenbach et al. |
| 5,906,594 A | 5/1999 | Scarfone |
| 5,910,130 A | 6/1999 | Caizza |
| 5,910,132 A | 6/1999 | Schultz |
| 5,911,705 A | 6/1999 | Howell |
| 5,913,859 A | 6/1999 | Shapira |
| 5,916,175 A | 6/1999 | Bauer |
| 5,928,162 A | 7/1999 | Giurtino et al. |
| 5,928,163 A | 7/1999 | Roberts |
| 5,928,200 A | 7/1999 | Thorne et al. |
| 5,935,109 A | 8/1999 | Donnan |
| 5,947,930 A | 9/1999 | Schwemberger et al. |
| 5,951,489 A | 9/1999 | Bauer |
| 5,951,525 A | 9/1999 | Thorne |
| 5,951,582 A | 9/1999 | Thorne et al. |
| 5,954,696 A | 9/1999 | Ryan |
| 5,954,698 A | 9/1999 | Pike |
| 5,957,863 A | 9/1999 | Koblish et al. |
| 5,957,887 A | 9/1999 | Osterlind et al. |
| 5,957,892 A | 9/1999 | Thorne |
| 5,961,526 A | 10/1999 | Chu |
| 5,961,534 A | 10/1999 | Banik |
| 5,964,717 A | 10/1999 | Gottlieb et al. |
| 5,967,490 A | 10/1999 | Pike |
| 5,976,115 A | 11/1999 | Parris et al. |
| 5,979,840 A | 11/1999 | Hollister |
| 5,980,488 A | 11/1999 | Thorne |
| 5,989,196 A | 11/1999 | Chu et al. |
| 5,989,229 A | 11/1999 | Chiappetta |
| 5,989,241 A | 11/1999 | Plishka |
| 5,993,426 A | 11/1999 | Hollister |
| 6,000,846 A | 12/1999 | Gregory et al. |
| 6,001,080 A | 12/1999 | Kuracina et al. |
| 6,004,294 A | 12/1999 | Brimhall et al. |
| 6,007,560 A | 12/1999 | Gottlieb et al. |
| 6,015,391 A | 1/2000 | Rishton et al. |
| 6,022,324 A | 2/2000 | Skinner |
| 6,024,708 A | 2/2000 | Bales et al. |
| 6,024,727 A | 2/2000 | Thorne et al. |
| 6,033,369 A | 3/2000 | Goldenberg |
| 6,036,361 A | 3/2000 | Gregory et al. |
| 6,036,675 A | 3/2000 | Thorne |
| 6,047,729 A | 4/2000 | Hollister |
| 6,050,954 A | 4/2000 | Mittermeier |
| 6,050,976 A | 4/2000 | Thorne et al. |
| 6,053,877 A | 4/2000 | Banik et al. |
| 6,063,037 A | 5/2000 | Mittermeier |
| 6,063,040 A | 5/2000 | Owen et al. |
| 6,071,284 A | 6/2000 | Fox |
| 6,080,115 A | 6/2000 | Rubinstein |
| 6,083,176 A | 7/2000 | Terwilliger |
| 6,083,202 A | 7/2000 | Smith |
| 6,086,563 A | 7/2000 | Moulton |
| 6,090,078 A | 7/2000 | Erskine |
| 6,090,108 A | 7/2000 | McBrayer et al. |
| 6,095,967 A | 8/2000 | Black |
| 6,096,005 A | 8/2000 | Botich |
| 6,102,920 A | 8/2000 | Sullivan |
| 6,106,484 A | 8/2000 | Terwilliger |
| 6,110,128 A | 8/2000 | Andelin |
| 6,110,129 A | 8/2000 | Terwilliger |
| 6,110,176 A | 8/2000 | Shapira |
| RE36,885 E | 9/2000 | Blecher et al. |
| 6,117,108 A | 9/2000 | Woehr et al. |
| 6,117,112 A | 9/2000 | Mahurkar |
| 6,117,115 A | 9/2000 | Hill et al. |
| 6,132,401 A | 10/2000 | Van Der Meyden |
| 6,135,110 A | 10/2000 | Roy |
| 6,142,956 A | 11/2000 | Kortenbach |
| 6,142,957 A | 11/2000 | Diamond et al. |
| 6,149,629 A | 11/2000 | Wilson |
| 6,171,284 B1 | 1/2001 | Kao |
| 6,174,292 B1 | 1/2001 | Kortenbach et al. |
| 6,193,671 B1 | 2/2001 | Turturro et al. |
| 6,197,007 B1 | 3/2001 | Thorne et al. |
| 6,203,527 B1 | 3/2001 | Zadini |
| 6,210,373 B1 | 4/2001 | Allmon |
| 6,217,556 B1 | 4/2001 | Ellingson et al. |
| 6,221,029 B1 | 4/2001 | Mathis et al. |
| 6,221,047 B1 | 4/2001 | Greene |
| 6,224,569 B1 | 5/2001 | Brimhall |
| 6,224,576 B1 | 5/2001 | Thorne |
| 6,234,773 B1 | 5/2001 | Hill et al. |
| 6,254,575 B1 | 7/2001 | Thorne, Jr. et al. |
| 6,261,242 B1 | 7/2001 | Roberts |
| 6,264,617 B1 | 7/2001 | Bales et al. |
| D446,135 S | 8/2001 | Chen |
| 6,280,399 B1 | 8/2001 | Rossin et al. |
| 6,280,401 B1 | 8/2001 | Mahurkar |
| 6,280,419 B1 | 8/2001 | Vojtasek |
| 6,280,420 B1 | 8/2001 | Ferguson et al. |
| D448,314 S | 9/2001 | Chen |
| 6,283,925 B1 | 9/2001 | Terwilliger |
| 6,287,278 B1 | 9/2001 | Woehr et al. |
| 6,293,700 B1 | 9/2001 | Lund et al. |
| 6,302,852 B1 | 10/2001 | Fleming, III |
| 6,309,376 B1 | 10/2001 | Alesi |
| 6,312,394 B1 | 11/2001 | Fleming, III |
| 6,315,737 B1 | 11/2001 | Skinner |
| 6,321,782 B1 | 11/2001 | Hollister |
| 6,322,537 B1 | 11/2001 | Chang |
| 6,328,701 B1 | 12/2001 | Terwilliger |
| 6,328,713 B1 | 12/2001 | Hollister |
| 6,334,857 B1 | 1/2002 | Hollister |

| | | |
|---|---|---|
| 6,336,915 B1 | 1/2002 | Scarfone |
| 6,340,351 B1 | 1/2002 | Goldenberg |
| 6,358,252 B1 | 3/2002 | Shapira |
| 6,358,265 B1 | 3/2002 | Thorne, Jr. et al. |
| 6,361,525 B2 | 3/2002 | Capes et al. |
| 6,379,333 B1 | 4/2002 | Brimhall et al. |
| 6,379,338 B1 | 4/2002 | Garvin |
| 6,383,144 B1 | 5/2002 | Mooney et al. |
| 6,406,459 B1 | 6/2002 | Allmon |
| 6,409,701 B1 | 6/2002 | Cohn et al. |
| 6,416,484 B1 | 7/2002 | Miller |
| 6,423,034 B2 | 7/2002 | Scarfone |
| 6,439,768 B1 | 8/2002 | Wu et al. |
| 6,443,910 B1 | 9/2002 | Krueger |
| 6,443,927 B1 | 9/2002 | Cook |
| 6,443,929 B1 | 9/2002 | Kuracina et al. |
| 6,478,751 B1 | 11/2002 | Krueger et al. |
| 6,485,468 B2 | 11/2002 | Vojtasek |
| 6,485,473 B1 | 11/2002 | Lynn |
| 6,488,663 B1 | 12/2002 | Steg |
| 6,500,129 B1 | 12/2002 | Mahurkar |
| 6,501,384 B2 | 12/2002 | Chapman et al. |
| 6,517,516 B1 | 2/2003 | Caizza |
| 6,519,569 B1 | 2/2003 | White et al. |
| 6,520,938 B1 | 2/2003 | Funderburk |
| 6,537,255 B1 | 3/2003 | Raines |
| 6,537,259 B1 | 3/2003 | Niermann |
| 6,544,194 B1 | 4/2003 | Kortenbach |
| 6,551,287 B2 | 4/2003 | Hollister |
| 6,551,328 B2 | 4/2003 | Kortenbach |
| 6,554,778 B1 | 4/2003 | Fleming, III |
| 6,569,125 B2 | 5/2003 | Jepson et al. |
| 6,575,919 B1 | 6/2003 | Reiley et al. |
| 6,582,402 B1 | 6/2003 | Erskine |
| 6,582,446 B1 | 6/2003 | Marchosky |
| 6,585,704 B2 | 7/2003 | Luther |
| 6,592,556 B1 | 7/2003 | Thorne |
| 6,595,954 B1 | 7/2003 | Luther |
| 6,595,955 B2 | 7/2003 | Ferguson et al. |
| 6,613,018 B2 | 9/2003 | Bagga et al. |
| 6,616,604 B1 | 9/2003 | Bass |
| 6,616,630 B1 | 9/2003 | Woehr et al. |
| 6,623,458 B2 | 9/2003 | Woehr et al. |
| 6,626,850 B1 | 9/2003 | Chau et al. |
| D480,977 S | 10/2003 | Wawro et al. |
| D481,321 S | 10/2003 | Knieriem et al. |
| 6,629,959 B2 | 10/2003 | Kuracina et al. |
| 6,634,789 B2 | 10/2003 | Babkes |
| 6,635,003 B2 | 10/2003 | Marchant |
| 6,638,252 B2 | 10/2003 | Moulton |
| 6,638,254 B2 | 10/2003 | Nakagami |
| 6,641,562 B1 | 11/2003 | Peterson |
| 6,652,486 B2 | 11/2003 | Bialecki et al. |
| 6,652,490 B2 | 11/2003 | Howell |
| 6,663,592 B2 | 12/2003 | Rhad et al. |
| 6,673,047 B2 | 1/2004 | Crawford |
| 6,673,060 B1 | 1/2004 | Fleming, III |
| 6,682,510 B2 | 1/2004 | Niermann |
| 6,689,102 B2 | 2/2004 | Greene |
| 6,692,471 B2 | 2/2004 | Boudreaux |
| 6,695,814 B2 | 2/2004 | Greene |
| 6,698,921 B2 | 3/2004 | Siefert |
| 6,699,221 B2 | 3/2004 | Vaillancourt |
| 6,702,786 B2 | 3/2004 | Olovson |
| 6,709,419 B2 | 3/2004 | Woehr |
| 6,719,732 B2 | 4/2004 | Courteix |
| 6,723,075 B2 | 4/2004 | Davey |
| 6,727,805 B2 | 4/2004 | Hollister |
| 6,730,043 B2 | 5/2004 | Krueger |
| 6,731,216 B2 | 5/2004 | Ho et al. |
| 6,740,063 B2 | 5/2004 | Lynn |
| 6,749,576 B2 | 6/2004 | Bauer |
| 6,749,588 B1 | 6/2004 | Howell et al. |
| 6,749,595 B1 | 6/2004 | Murphy |
| 6,755,793 B2 | 6/2004 | Lamoureux |
| 6,761,704 B2 | 7/2004 | Crawford |
| 6,761,706 B2 | 7/2004 | Vaillancourt |
| 6,764,567 B2 | 7/2004 | Sperko et al. |
| 6,767,336 B1 | 7/2004 | Kaplan |
| 6,770,050 B2 | 8/2004 | Epstein |
| 6,770,053 B2 | 8/2004 | Scarfone |
| 6,796,962 B2 | 9/2004 | Ferguson et al. |
| 6,796,968 B2 | 9/2004 | Ferguson et al. |
| 6,798,348 B1 | 9/2004 | Wilker et al. |
| 6,821,267 B2 | 11/2004 | Veillon, Jr. et al. |
| 6,832,990 B2 | 12/2004 | Kortenbach |
| 6,832,992 B2 | 12/2004 | Wilkinson |
| 6,839,651 B2 | 1/2005 | Lantz et al. |
| 6,846,314 B2 | 1/2005 | Shapira |
| 6,849,051 B2 | 2/2005 | Sramek |
| 6,855,128 B2 | 2/2005 | Swenson |
| 6,855,130 B2 | 2/2005 | Saulenas et al. |
| 6,860,871 B2 | 3/2005 | Kuracina et al. |
| 6,875,183 B2 | 4/2005 | Cervi |
| 6,890,308 B2 | 5/2005 | Islam |
| 6,902,546 B2 | 6/2005 | Ferguson |
| 6,916,292 B2 | 7/2005 | Morawski |
| 6,916,311 B2 | 7/2005 | Vojtasek |
| 6,916,314 B2 | 7/2005 | Schneider |
| 6,923,813 B2 | 8/2005 | Phillips et al. |
| 6,936,036 B2 | 8/2005 | Wilkinson |
| D512,506 S | 12/2005 | Layne et al. |
| D512,924 S | 12/2005 | Ikeda |
| 6,981,948 B2 | 1/2006 | Pellegrino |
| 6,983,062 B2 | 1/2006 | Smith |
| 6,984,213 B2 | 1/2006 | Horner et al. |
| 6,984,216 B2 | 1/2006 | Sendijarevic et al. |
| 6,989,003 B2 | 1/2006 | Wing et al. |
| 7,001,363 B2 | 2/2006 | Ferguson |
| 7,004,927 B2 | 2/2006 | Ferguson et al. |
| 7,008,402 B2 | 3/2006 | Ferguson et al. |
| 7,018,343 B2 | 3/2006 | Plishka |
| 7,033,324 B2 | 4/2006 | Giusti et al. |
| 7,063,703 B2 | 6/2006 | Reo |
| 7,108,679 B2 | 9/2006 | Alchas |
| 7,112,191 B2 | 9/2006 | Daga |
| 7,118,552 B2 | 10/2006 | Shaw |
| 7,147,607 B2 | 12/2006 | Wang |
| 7,179,244 B2 | 2/2007 | Smith et al. |
| 7,204,812 B2 | 4/2007 | Wang |
| 7,207,973 B2 | 4/2007 | Barrelle |
| 7,214,208 B2 | 5/2007 | Vaillancourt |
| 7,226,434 B2 | 6/2007 | Carlyon et al. |
| 7,238,169 B2 | 7/2007 | Takagi et al. |
| 7,247,148 B2 | 7/2007 | Murashita |
| 7,264,613 B2 | 9/2007 | Woehr et al. |
| 7,300,420 B2 | 11/2007 | Doyle |
| 7,303,548 B2 | 12/2007 | Rhad et al. |
| 7,341,573 B2 | 3/2008 | Ferguson et al. |
| 7,357,784 B2 | 4/2008 | Ferguson |
| 7,377,908 B2 | 5/2008 | Buetikofer et al. |
| 7,413,562 B2 | 8/2008 | Ferguson et al. |
| 7,458,954 B2 | 12/2008 | Ferguson et al. |
| 7,488,306 B2 | 2/2009 | Nguyen |
| 7,500,965 B2 | 3/2009 | Menzi et al. |
| 7,513,888 B2 | 4/2009 | Sircom |
| 2002/0003832 A1 | 1/2002 | Siefert |
| 2002/0181545 A1* | 12/2002 | Babkes .................. 374/208 |
| 2003/0002562 A1 | 1/2003 | Yerlikaya et al. |
| 2003/0023398 A1 | 1/2003 | Lantz et al. |
| 2003/0114797 A1 | 6/2003 | Vaillancourt et al. |
| 2003/0144627 A1 | 7/2003 | Woehr et al. |
| 2003/0176810 A1 | 9/2003 | Maahs et al. |
| 2003/0214999 A1 | 11/2003 | Chapman et al. |
| 2003/0220617 A1 | 11/2003 | Dickerson |
| 2004/0071182 A1 | 4/2004 | Quinn et al. |

| | | |
|---|---|---|
| 2004/0071188 A1 | 4/2004 | Knieriem et al. |
| 2004/0077973 A1 | 4/2004 | Groenke et al. |
| 2004/0078007 A1 | 4/2004 | Nguyen |
| 2004/0105487 A1 | 6/2004 | Chen |
| 2004/0146087 A1 | 7/2004 | Penney et al. |
| 2004/0153005 A1 | 8/2004 | Krueger |
| 2004/0186434 A1 | 9/2004 | Harding et al. |
| 2004/0225260 A1 | 11/2004 | Danilo et al. |
| 2004/0236288 A1 | 11/2004 | Howell et al. |
| 2005/0027263 A1 | 2/2005 | Woehr et al. |
| 2005/0043691 A1 | 2/2005 | Ferguson |
| 2005/0054987 A1 | 3/2005 | Perez et al. |
| 2005/0070850 A1 | 3/2005 | Albrecht |
| 2005/0070855 A1 | 3/2005 | Ferguson et al. |
| 2005/0075609 A1 | 4/2005 | Latona |
| 2005/0083994 A1 | 4/2005 | Wawro et al. |
| 2005/0113716 A1 | 5/2005 | Mueller, Jr. et al. |
| 2005/0119652 A1 | 6/2005 | Vetter et al. |
| 2005/0131345 A1 | 6/2005 | Miller |
| 2005/0137500 A1 | 6/2005 | Wingler |
| 2005/0165404 A1 | 7/2005 | Miller |
| 2005/0192536 A1 | 9/2005 | Takagi et al. |
| 2005/0249263 A1 | 11/2005 | Yerlikaya et al. |
| 2005/0267383 A1 | 12/2005 | Groenke et al. |
| 2005/0273057 A1 | 12/2005 | Popov |
| 2005/0277845 A1 | 12/2005 | Cooke et al. |
| 2005/0288605 A1 | 12/2005 | Pellegrino et al. |
| 2006/0052721 A1 | 3/2006 | Dunker et al. |
| 2006/0064101 A1 | 3/2006 | Arramon |
| 2006/0072645 A1 | 4/2006 | Quinn et al. |
| 2006/0116603 A1 | 6/2006 | Shibazaki et al. |
| 2006/0178625 A1 | 8/2006 | Lim et al. |
| 2006/0189934 A1 | 8/2006 | Kuracina et al. |
| 2006/0189936 A1 | 8/2006 | Carlyon et al. |
| 2006/0200195 A1 | 9/2006 | Yang |
| 2006/0276772 A1 | 12/2006 | Moos et al. |
| 2007/0098040 A1* | 5/2007 | Sisk et al. .................. 374/163 |
| 2007/0110122 A1* | 5/2007 | Sisk et al. .................. 374/163 |
| 2007/0116089 A1* | 5/2007 | Bisch et al. ................. 374/208 |
| 2008/0097345 A1 | 4/2008 | Ferguson |
| 2008/0112461 A1* | 5/2008 | Bisch et al. ................. 374/163 |
| 2008/0294065 A1* | 11/2008 | Waldhoff et al. ........... 600/549 |

FOREIGN PATENT DOCUMENTS

| | | |
|---|---|---|
| EP | 0064127 A2 | 10/1982 |
| EP | 1358846 A1 | 11/2003 |
| EP | 1788370 A1 | 5/2007 |
| JP | 56117131 | 9/1981 |
| JP | 61144526 | 7/1986 |
| JP | 6241914 | 9/1994 |
| WO | 96-22800 A1 | 8/1996 |
| WO | 97-42989 A1 | 11/1997 |
| WO | 2004060138 A2 | 7/2004 |
| WO | 2004091687 A2 | 10/2004 |
| WO | 2005009246 A1 | 2/2005 |
| WO | 2005053774 A1 | 6/2005 |
| WO | 2005060679 A2 | 7/2005 |

OTHER PUBLICATIONS

Office Action issued Mar. 19, 2009 from related European Patent Application Serial No. 07117902.2, 3 pgs.

* cited by examiner

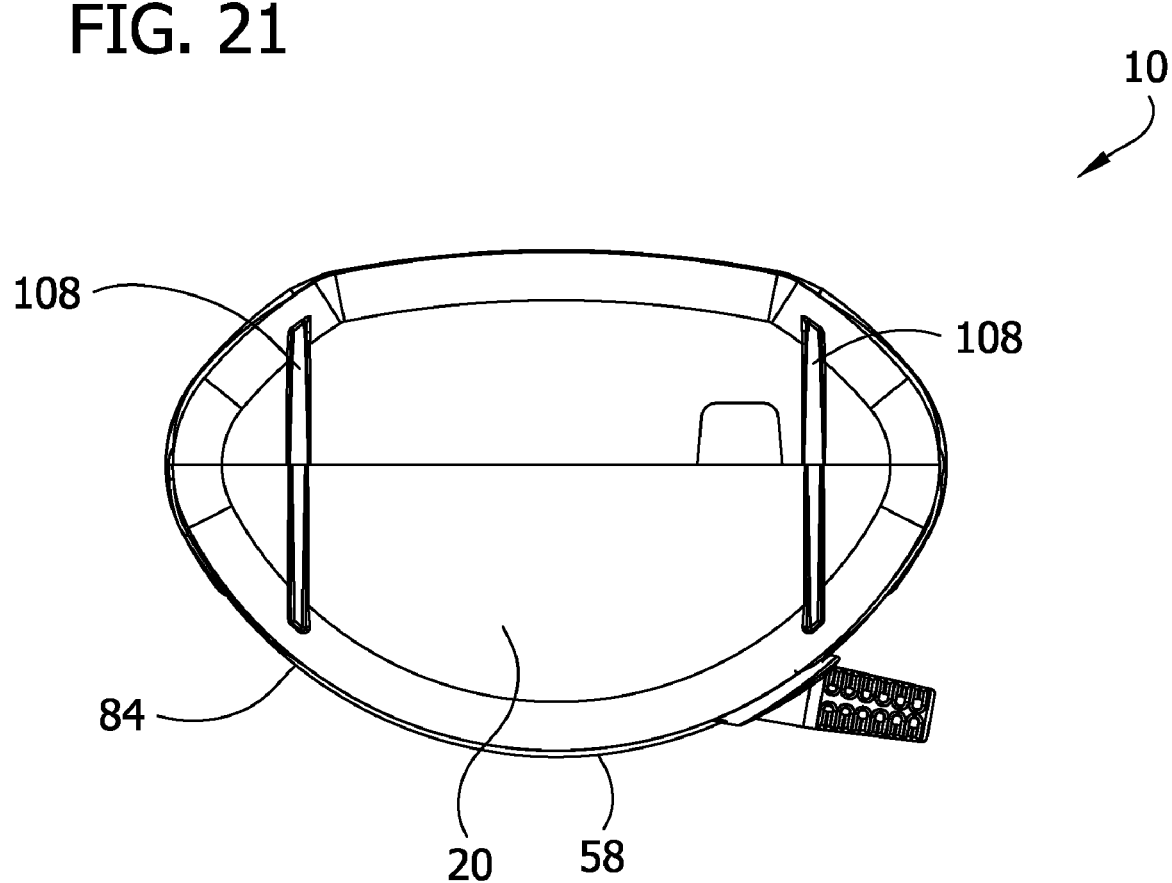

ELECTRONIC THERMOMETER

CROSS REFERENCE TO RELATED APPLICATIONS

This application is a continuation-in-part of pending U.S. Design application Ser. No. 29/241,955 filed Nov. 3, 2005, the disclosure of which is incorporated herein by reference in its entirety.

FIELD OF THE INVENTION

The present invention generally relates to hand-held electronic thermometer.

BACKGROUND OF THE INVENTION

Electronic thermometers are widely used in the healthcare field for measuring a patient's body temperature. Typical electronic thermometers have a base unit that is held in the palm of a hand and a probe with an elongated shaft connected to the base. The base unit includes a probe well for removably housing the probe when the thermometer is not in use. Electronic temperature sensors such as thermistors or other temperature sensitive elements are contained within a tip of the probe. When the tip is placed, for example, in a patient's mouth, the tip is heated up by the patient's body and the thermistor measures the temperature of the tip. A microcontroller in the base unit receives input from the thermistor to compute the patient's temperature. The temperature is then typically displayed on a LCD screen. Push buttons interfaced with the microcontroller are disposed below the LCD screen to allow the user to communicate with the microcontroller.

Some conventional electronic thermometers of the type described above are somewhat difficult to hold and operate with one hand. Moreover, because the LCD screen is above the buttons, the thermometer is typically top heavy and awkward to hold because the user holds the thermometer adjacent to a bottom of the thermometer so that he/she can access the buttons with his/her thumbs.

SUMMARY OF THE INVENTION

In one embodiment, a hand-held electronic thermometer generally comprises a temperature sensing component and a housing having a top, a bottom and a height that extends generally transverse to lengths of a user's fingers when being held in a hand of a user. A microcontroller in the housing is in communication with the temperature sensing component. A display on the housing is in communication with the microcontroller and is capable of displaying a temperature detected by the temperature sensing component. A control panel on the housing is defined by at least one input interface device in communication with the microcontroller for operating the thermometer. The control panel is disposed above the display screen so that a user may hold the base unit with one hand and a thumb of the hand is naturally positioned adjacent to the interface device to allow the user to quickly access the interface device with the thumb without substantially blocking the display screen.

In another embodiment, a hand-held electronic thermometer generally comprises a probe including at least one temperature sensing component disposed within the probe and a housing having a front side and a back side, a top and a bottom, and a height that extends generally transverse to lengths of a user's fingers when being held in a hand of a user. A microcontroller in the housing is in communication with the temperature sensing component of the probe. A display on the housing is in communication with the microcontroller and is capable of displaying a temperature detected by the temperature sensing component. A probe well in the housing on the back side of the housing is sized and shaped to receive the probe. The probe well is disposed a distance below the top of the housing so that when the probe is seated in the probe well an entirety of the probe is disposed below the top of the housing, whereby the probe is shielded by the housing.

In yet another embodiment, a hand-held electronic thermometer generally comprises a temperature sensing component and a housing having a front side and a back side, a top and a bottom, and a height that extends generally transverse to lengths of a user's fingers when being held in a hand of a user. The housing comprises an upper component and a lower component adapted to be releasably secured together. A microcontroller in the housing is in communication with the temperature sensing component of the probe. A display screen on the front of the housing is capable of displaying a temperature detected by the temperature sensing component. A compartment is in the lower component of the housing for containing a source of power for operating the thermometer. A door is on the back side of the lower component of the housing for accessing the compartment. The upper and lower components are configured to prevent the door from opening when the upper and lower components are secured together.

In a further embodiment, a hand-held electronic thermometer generally comprises a probe including a temperature sensing component and an elongate housing having a top, a bottom and a height that extends generally transverse to the length of a user's fingers when being held in a hand of the user. The bottom of the housing is formed to hold the housing in an upright position when the bottom is placed in engagement with a horizontal support surface. A microcontroller in the housing is in communication with the temperature sensing component of the probe. A display on the housing is in communication with the microcontroller and is capable of displaying a temperature detected by the temperature sensing component.

In yet a further embodiment, a hand-held electronic thermometer generally comprises a temperature sensing component and a housing having a top, a bottom and a height that extends generally transverse to lengths of a user's fingers when being held in a hand of a user. A microcontroller in the housing is in communication with the temperature sensing component. A display on the housing is in communication with the microcontroller and is capable of displaying a temperature detected by the temperature sensing component. The housing has a generally hourglass shape for gripping and retaining the thermometer in the hand.

Other features will be in part apparent and in part pointed out hereinafter.

BRIEF DESCRIPTION OF THE DRAWINGS

FIG. 21 is a bottom plan view of the thermometer.

Corresponding reference characters indicate corresponding parts throughout the drawings.

DETAILED DESCRIPTION OF THE DRAWINGS

Figure 1:
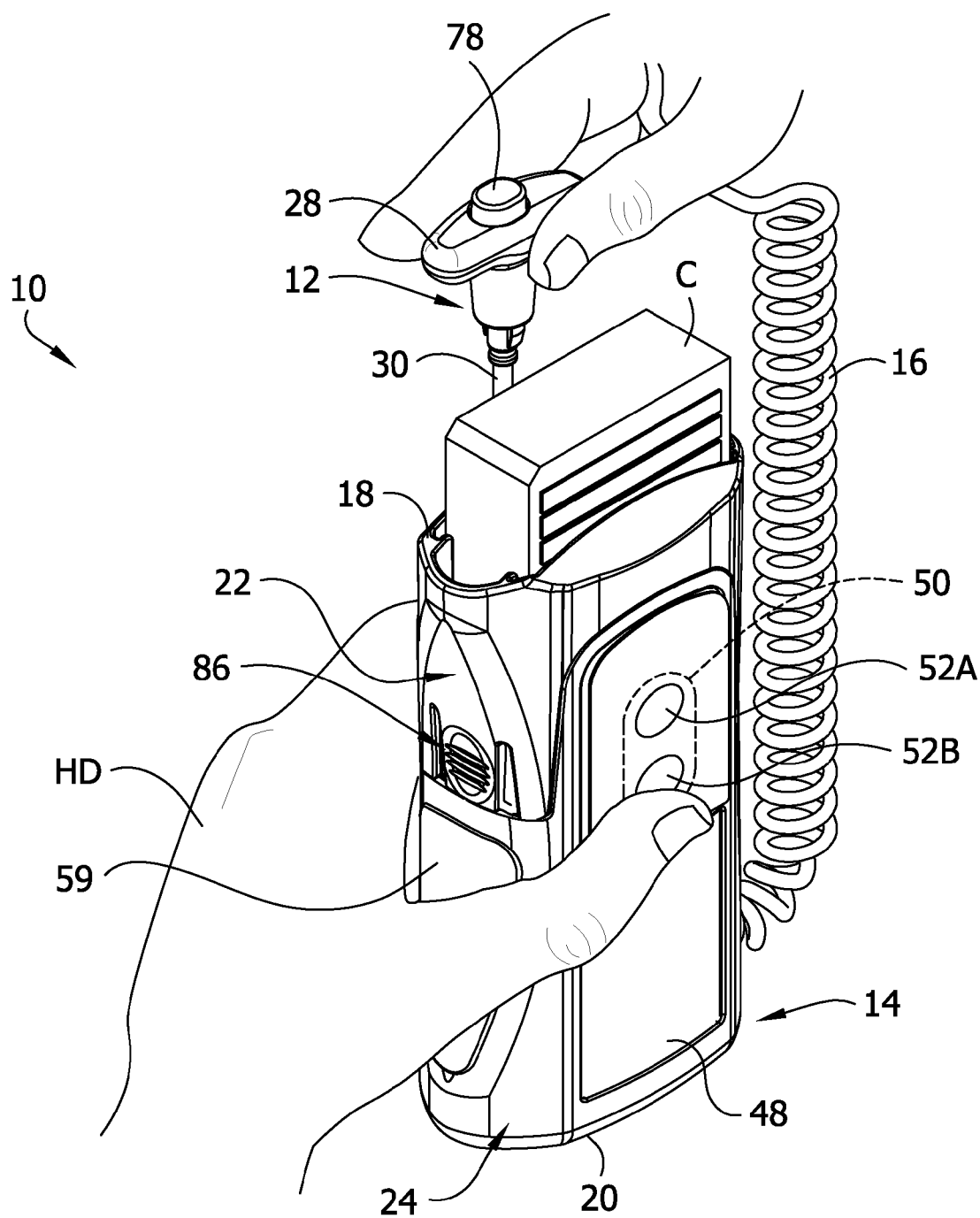
FIG. 1 is a perspective of one embodiment of a thermometer illustrating a housing of the thermometer being held by a user in one hand and a probe of the thermometer being held in the other hand.
Figure 2:
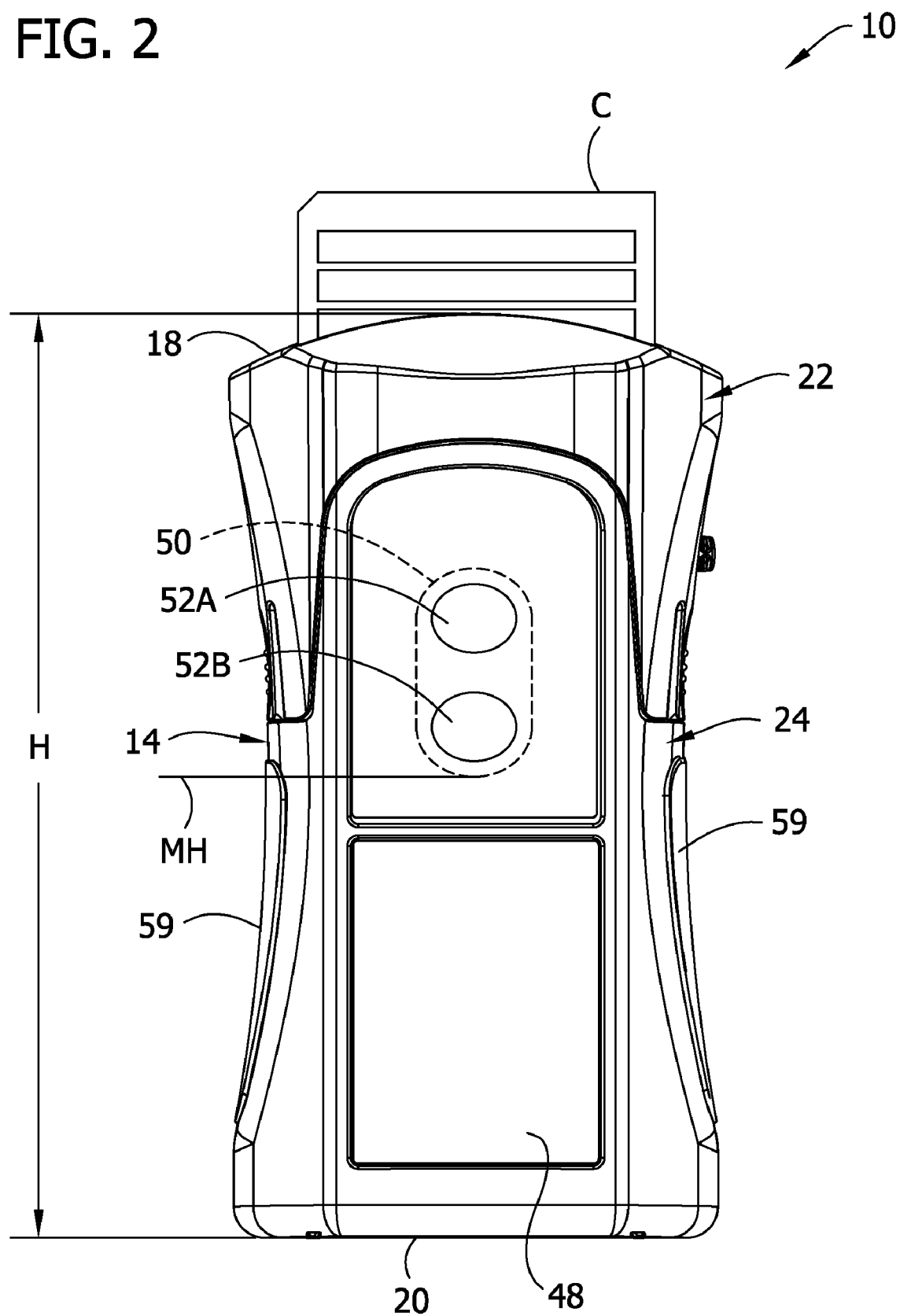
FIG. 2 is a front elevation of the housing.
Figure 3:
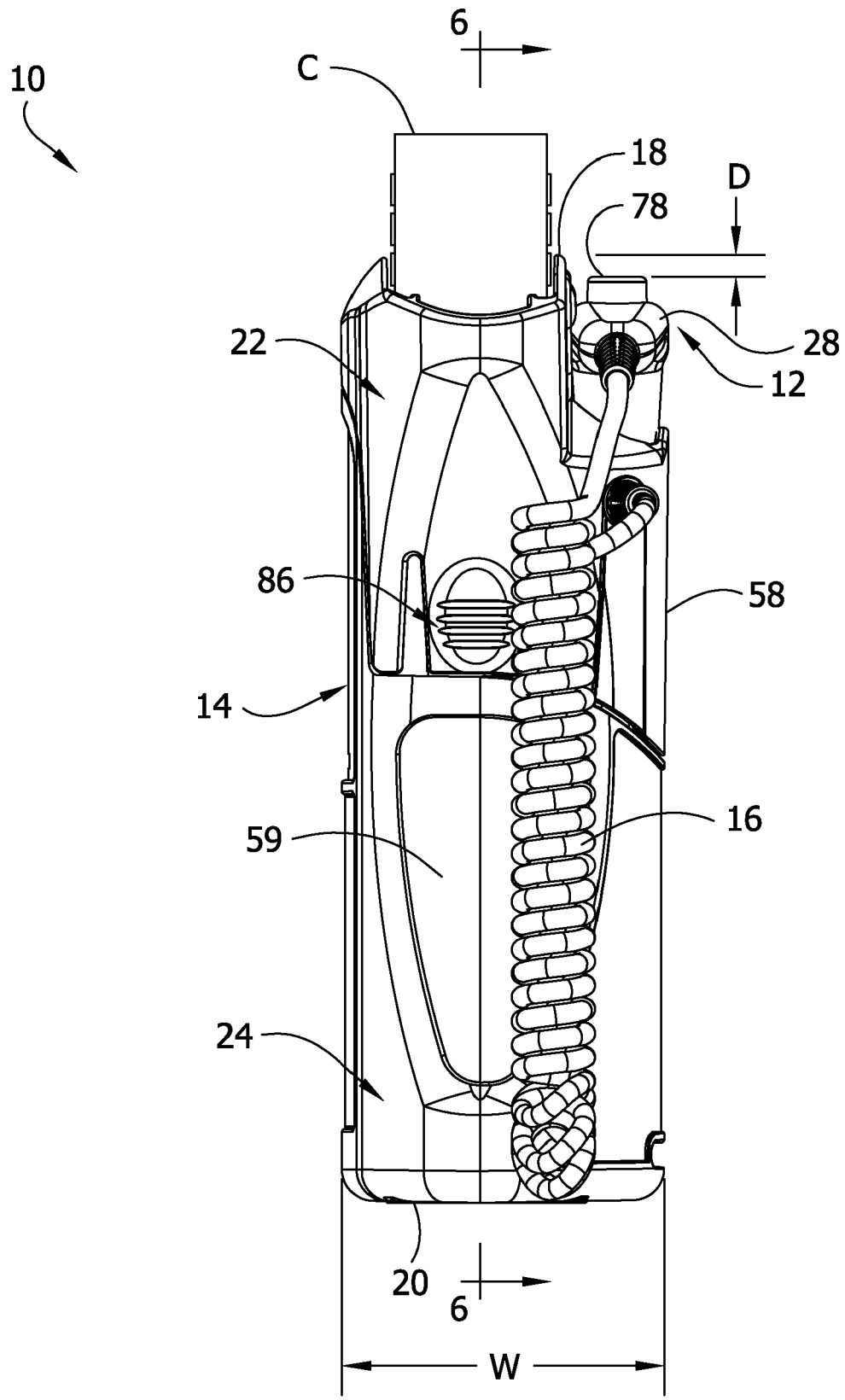
FIG. 3 is a side elevation of the thermometer.
Figure 4:
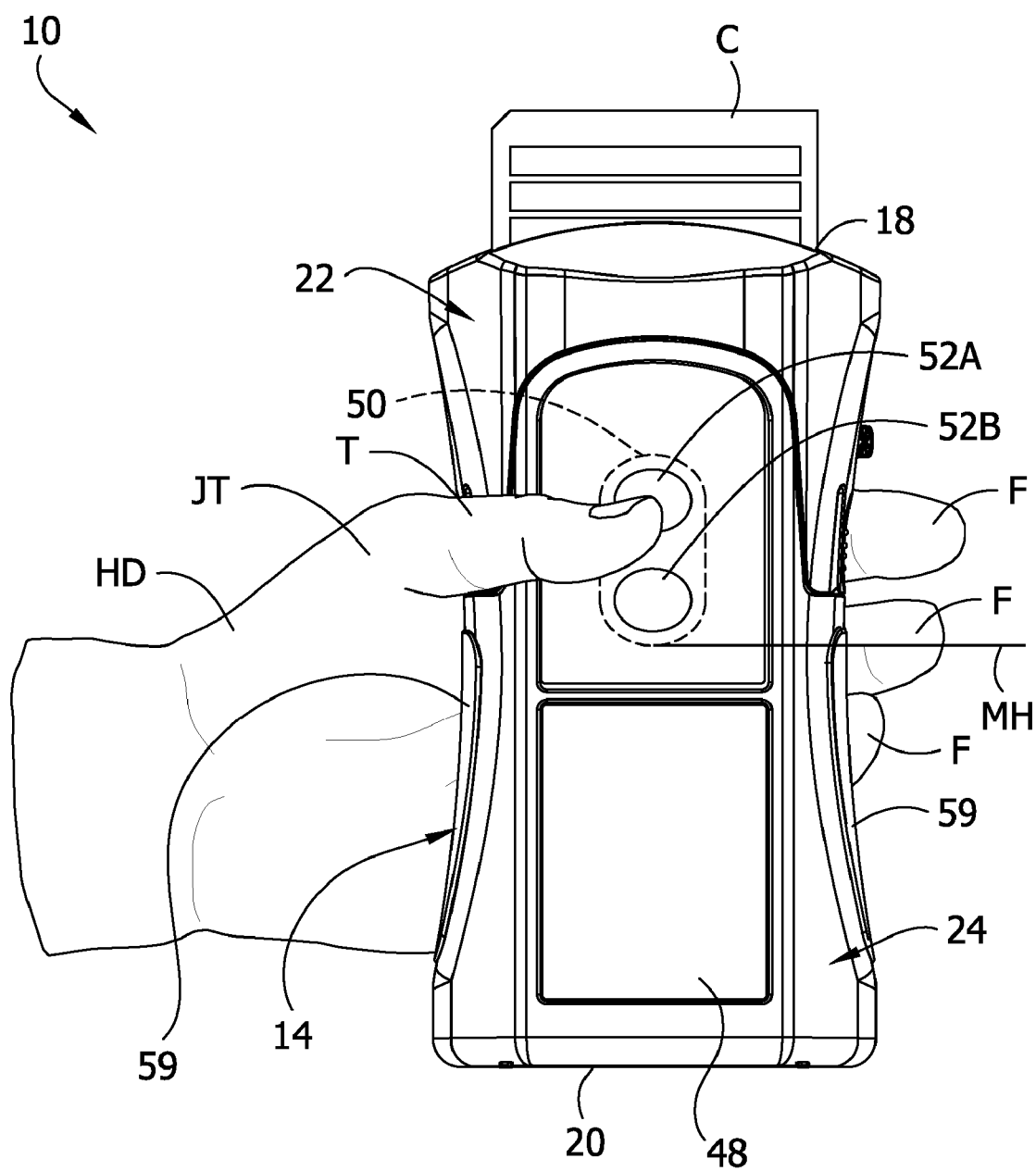
FIG. 4 is a front elevation of the thermometer being held in the hand of the user.
Figure 5:
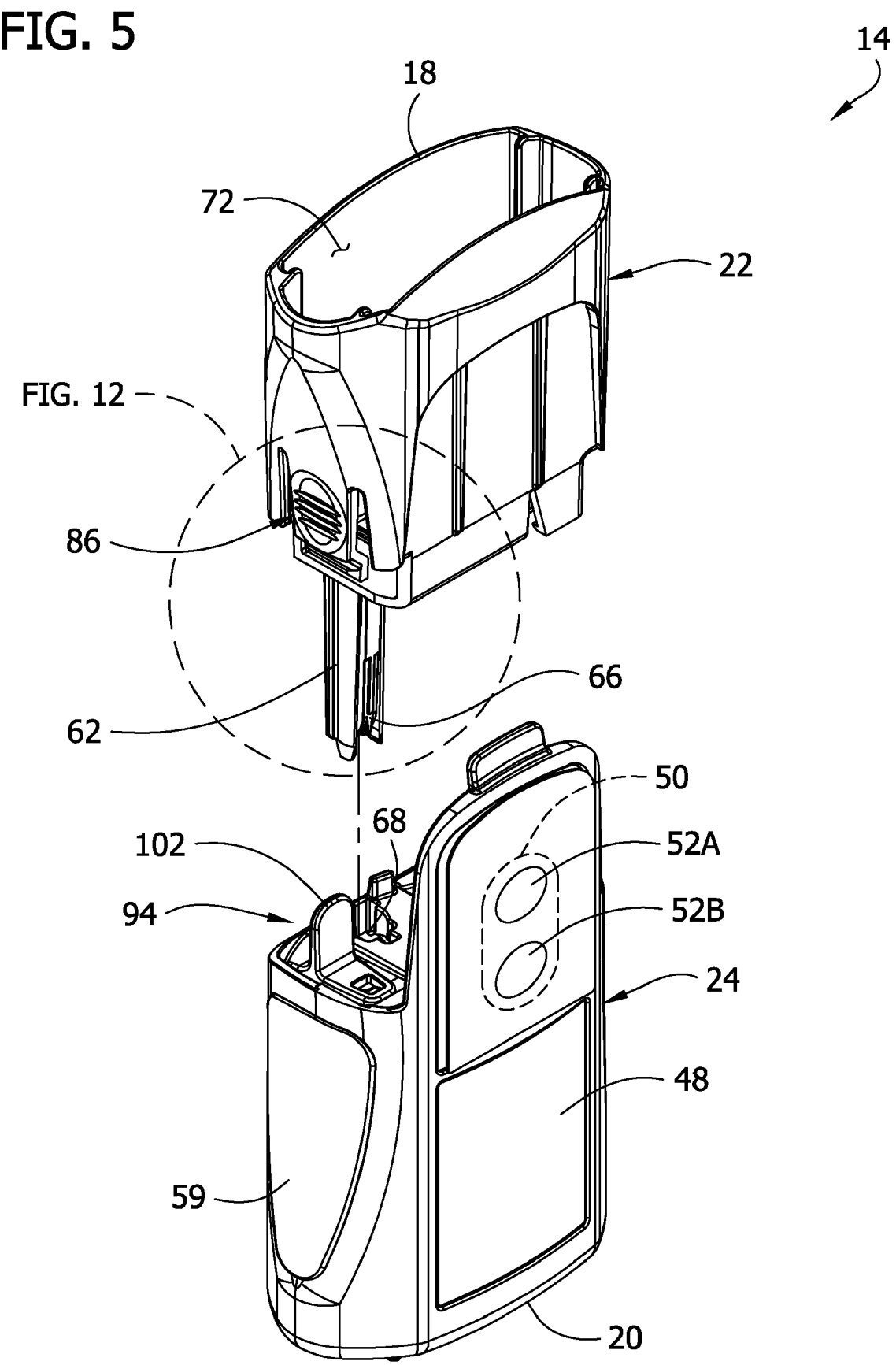
FIG. 5 is a perspective of the housing with an upper component of the housing exploded from a lower component of the housing.

Referring now to the drawings, and in particular to FIGS. 1-4, one embodiment of a thermometer constructed according to the principles of the present invention is generally indicated at 10. The thermometer generally comprises a probe 12 connected to a housing 14 by a helical cord 16. The housing 14 has a top 18, a bottom 20 and a height H (FIG. 2) extending between the top and the bottom. As explained in more detail below, the housing 14 includes an upper component, generally indicated at 22, and a lower component, generally indicated at 24, that are releasably secured together to form the housing 14 (FIG. 5). In use, the housing is held by a single hand HD of a user (as shown in FIG. 4) so that the user's fingers F extend generally transverse to the height H of the housing.

The probe 12 is constructed for contacting an object (e.g., tissue in a patient's mouth) and sending signals representative of the temperature to a microcontroller 26 (FIG. 6), which is secured to a circuit board 27 in the lower component 24 of the housing. The microcontroller 26 receives the signals from the probe 12 and uses them to calculate the temperature. The thermometer 10 may include other devices and/or circuitry for performing these calculations, which along with the microcontroller 26 constitute a calculating device of the thermometer. Logic in the microcontroller 26 may include a predictive algorithm for rapidly ascertaining the final temperature of the patient.

Figure 7:
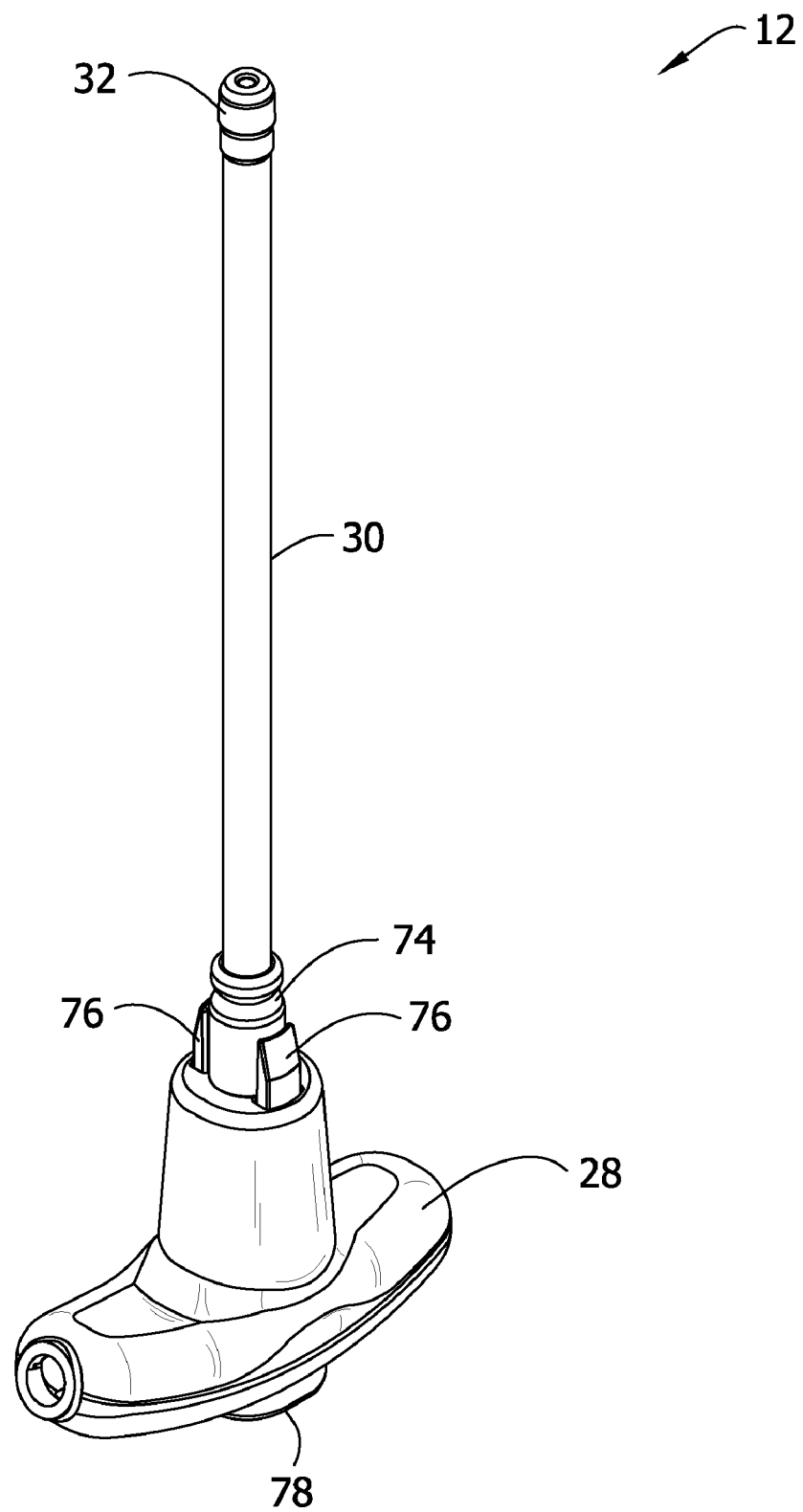
FIG. 7 is a perspective of the probe.
Figure 8:
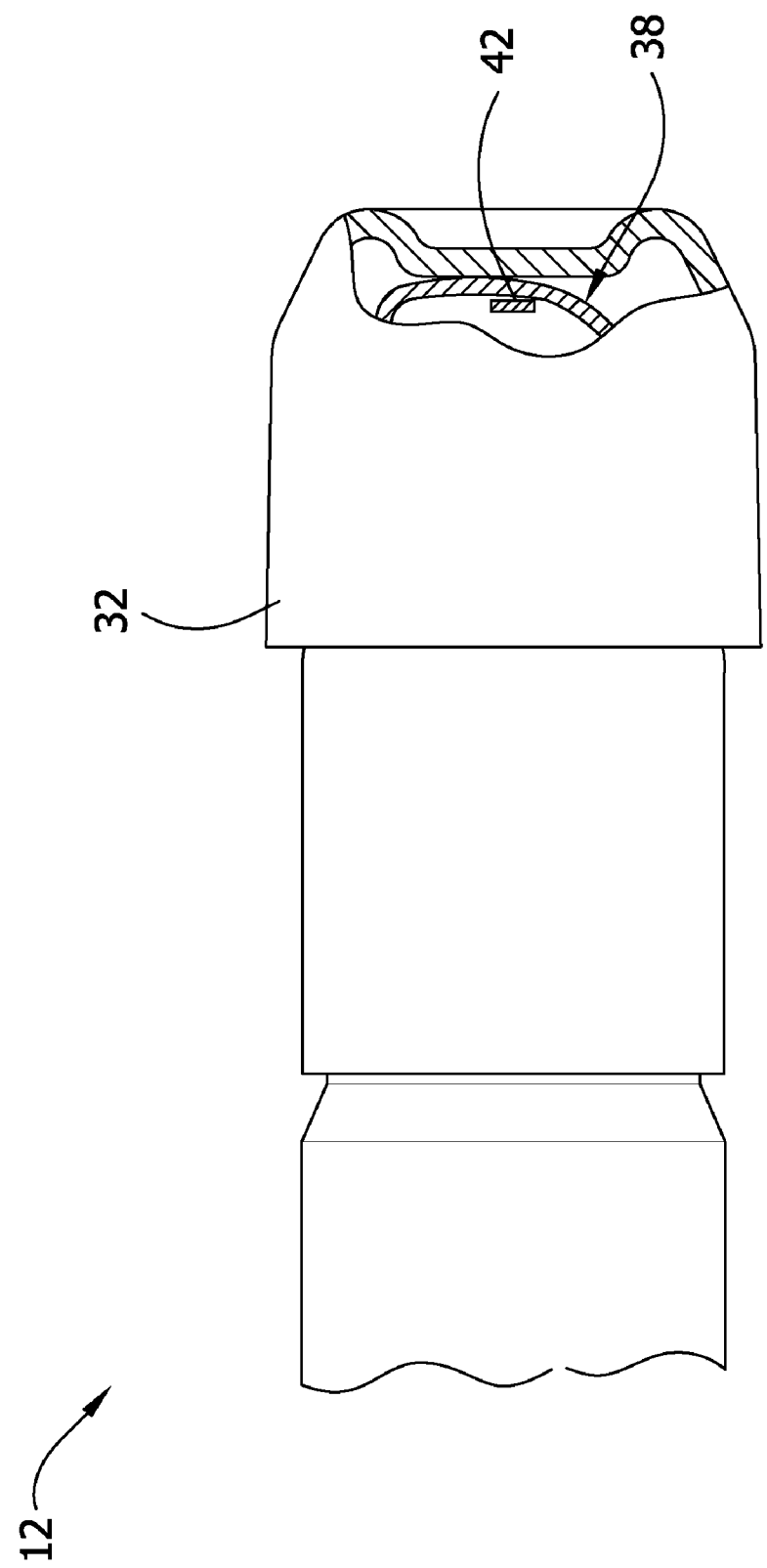
FIG. 8 is a fragmentary perspective of the probe with parts broken away to show internal construction.

Referring to FIGS. 7 and 8, the probe 12 includes a handle 28, a shaft 30 extending from the handle and an aluminum tip 32 at a distal end of the shaft. Referring now to FIG. 8, a flex circuit, generally indicated at 38, includes a deformable substrate mounting a tip thermistor 42. The tip thermistor is in thermal contact with the tip 32. The tip thermistor 42 generates a signal that is representative of the temperature of the tip 32. The signal is transmitted by one or more electrical conductors in the flex circuit 31 to the microcontroller 26 in the housing 14. Examples of a probe using a flex circuit are described in detail in co-assigned U.S. patent application Ser. Nos. 11/266,548 and 11/256,984, both of which were filed on Nov. 3, 2005, the entireties of which are herein incorporated by reference. It will be appreciated that other electrical components (not shown), including additional temperature sensing components, and other arrangements and numbers of components may be used without departing from the scope of the present invention.

Referring now to FIGS. 1, 2, 4 and 5, an LCD screen 48 (broadly, a display) and a control panel 50 defined by first and second buttons 52A, 52B (broadly, first and second input interface devices) are located on a front side 54 of the housing 14, more specifically, on a front side of the lower component 24 of the housing. The LCD screen 48 is in communication with the microcontroller 26 so that the microcontroller may make the calculated temperature appear on the screen. Other information desirably can appear on the screen 48, as will be appreciated by those of ordinary skill in the art. The buttons 52A, 52B of the control panel 50 allow the user to communicate with the microcontroller 26. The first button 52A activates the temperature reading function of the microcontroller 26 while the second button 52B switches between operational modes of the thermometer 10, such as oral, axillary and rectal. It is understood that the respective buttons 52A, 52B may have other functions within the scope of this invention. The thermometer 10 may also include additional buttons for performing other functions, a single button for performing a single or multiple functions, or no buttons. Further, it is understood that other devices besides button, such as switches, toggles, knobs, dials, touch screens, or keypads, for operating the thermometer 10 may be used in lieu of or in addition to the buttons 52A, 52B.

Referring still to FIG. 4, the locations of the LCD screen 48 and the control panel 50 on the front side 54 of the housing 14 allow the user to access the buttons of the control panel with his/her thumb while holding the housing with his/her hand without blocking the LCD screen and without substantially adjusting his/her hand on the housing. Thus, the user may more easily operate the thermometer 10 using one hand, while holding the probe 12 or performing other tasks with the other hand. When the user is properly holding the housing 14 in a palm of his/her hand HD, the control panel 50, more specifically, the buttons 52A, 52B are positioned generally in the vicinity of the natural position of the thumb T above the LCD screen 48 to accommodate the natural position of the user's thumb. Moreover, the LCD screen 48 is positioned so that the user's thumb T will not block the screen, even when manipulating the buttons. The aforementioned advantages are obtained whether the thermometer 10 is held in the left hand (as shown in FIG. 4) or in the right hand.

Referring still to FIG. 2, the preferable positions of the LCD screen 48 and the control panel 50 on the front side 54 of the housing 14 may be described in terms of a mid-height MH of the housing at its front side. As used herein, the mid-height MH of the housing 14 is located exactly between the top 18 and the bottom 20 of the housing 14. As shown in FIG. 4, the joint JT of the proximal phalange of the thumb and the corresponding metacarpal (i.e., where the thumb meets the hand) is disposed generally adjacent to the mid-height MH, and the thumb projects above the mid-height. Thus, at least a portion of the control panel 50 is preferably disposed above the mid-height MH, and more preferably at least a majority or the entirety of the control panel is disposed above the mid-height to accommodate the natural position of the thumb T. Moreover, at least a portion of the LCD screen 48 is preferably disposed below the mid-height MH, and more preferably at least a majority or an entirety of the LCD screen is disposed below the mid-height to ensure that the user's thumb T does not block the line of sight to the LCD screen during use.

Referring to FIGS. 1-4, and 10, the thermometer 10 has ergonomically designed features that allow the user to comfortably hold the thermometer in his/her hand H. Opposite lateral sides of the housing 14 are each convex or rounded outward in the direction of its width W (FIG. 3), and a back side 58 of the housing 14 is rounded outward, i.e., convex, from side to side of the housing. Together, the convex contours of the lateral sides and the convex contour of the back side 58 accommodates the natural curve of the user's palm and fingers F when the user grips the thermometer 10, thereby making the thermometer easy and comfortable to hold. The lateral sides of the housing 14 at the lower component 24 also include friction enhancing pads 59 for improving the comfort and grip of the housing 14. The pads 59 may be constructed of rubber or other material and may be adhered to the sides by adhesive or attached in other suitable ways.

Referring still to FIGS. 1-4, and 10, the lateral sides of the housing 10 are also concave along the height H of the housing 14, giving the thermometer a generally hourglass shape and making it easy and comfortable to hold. The user will naturally position his/her hand HD so that his/her hand is generally aligned or centered with the narrowest part of the housing 14, which generally corresponds to the mid-height MH of the housing. This aids in properly positioning the user's hand H in the preferred position so that the buttons 52A, 52B are readily accessible, as described above, and makes the thermometer 10 feels well-balanced in the hand HD of the user and requires minimal muscle exertion to hold. Moreover, because wider portions of the housing 14 are on either side of the hand HD (above and below the hand as shown in FIG. 4), gripping is enhanced.

Figure 9:
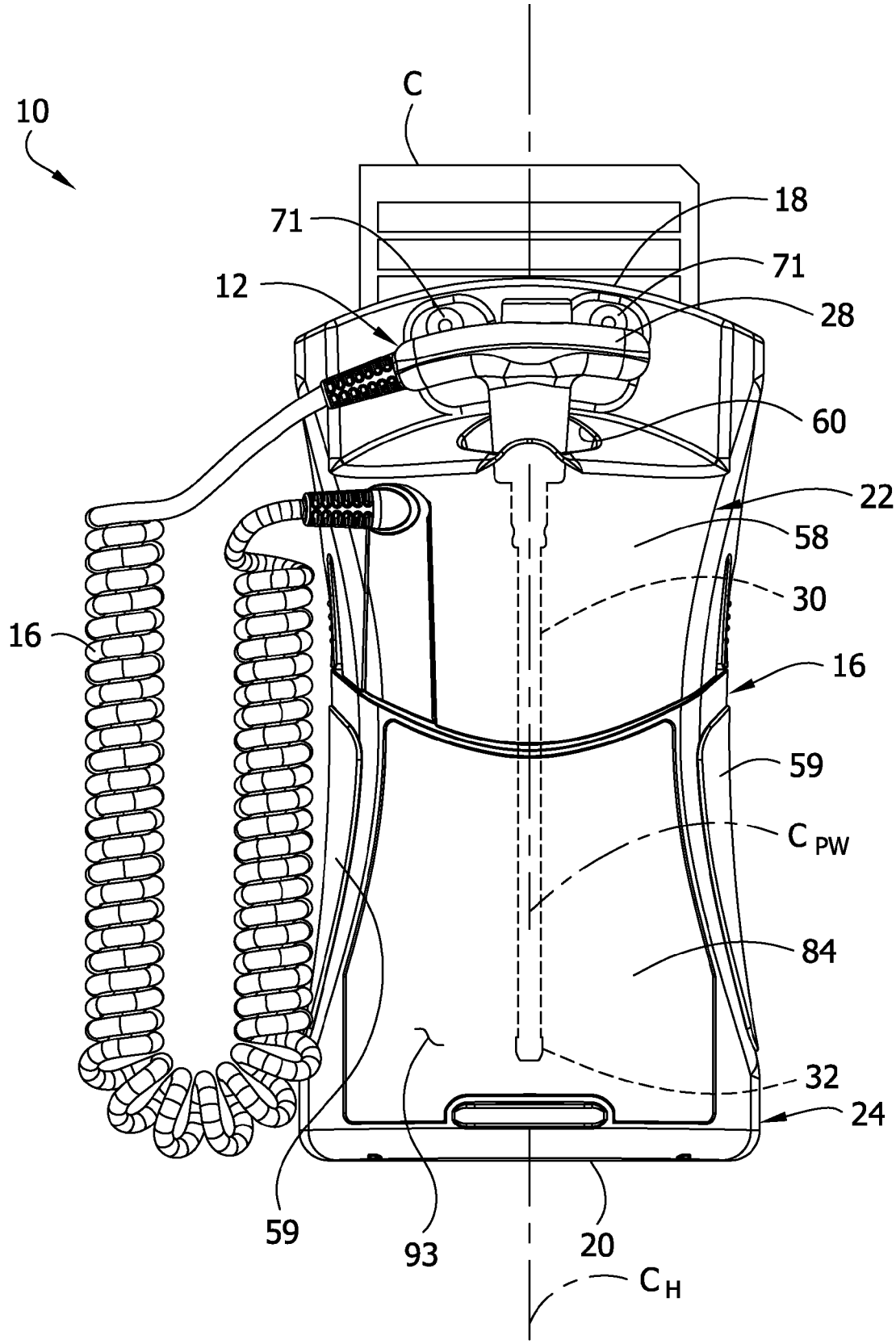
FIG. 9 is a rear elevation of the thermometer.

Referring to FIGS. 5 and 9-14, a probe well 60 is located at the rounded back side 58 of the upper component 22 of the housing 14. The probe well 60 receives the probe shaft 30 for holding the probe 12 and isolating the shaft from the environment when not in use. A centerline $C_{PW}$ of the probe well 12 is generally aligned with a centerline $C_H$ of the housing 14 (FIG. 9). The probe well 60 is disposed below the top 18 of the housing 14 so that when the probe 12 is seated in the probe well, the entire probe is disposed below the top of the housing (FIGS. 3 and 9). As shown in FIG. 3, the handle 28 of the probe 12 is disposed a distance D below the top 18 of the housing when the probe is seated in the probe well 60. The housing 14 shields the probe 12, more specifically the handle 28 of the probe, when the probe is seated in the probe well 60 and helps to protect the probe from significant damage if the thermometer is dropped.

The probe well 60 includes a distal end portion defined by a probe well extension 62 (FIG. 5) extending downward from a lower surface of the upper component 22. A front face of the probe well extension 62 includes a tab 66 for contacting the tip 42 of the probe 12 when the probe is received in the probe well 60. The tab 66 is part of an on/off mechanical switch for configuring the thermometer 10 in a non-activated state (e.g., turning the thermometer off or placing it in sleep mode) when the probe 12 is received in the well 60 and configuring the thermometer in an activated state (e.g., turning the thermometer on) when the probe is removed from the well. When the housing 14 is assembled, i.e., when the upper and lower components, 22, 24, respectively, are secured together, the probe well extension 62 is received in an opening 68 in the lower component 24 of the housing 14 (see FIG. 16) and the tab 66 at the front face of the extension is adjacent to an arm 67 having a projection 67A for engaging an actuator 69, such as a button or a toggle switch, of a mechanical switch 70, that is interfaced with the microcontroller 26 for configuring the thermometer 10 between the activated state and the non-activated state.

Figure 12:
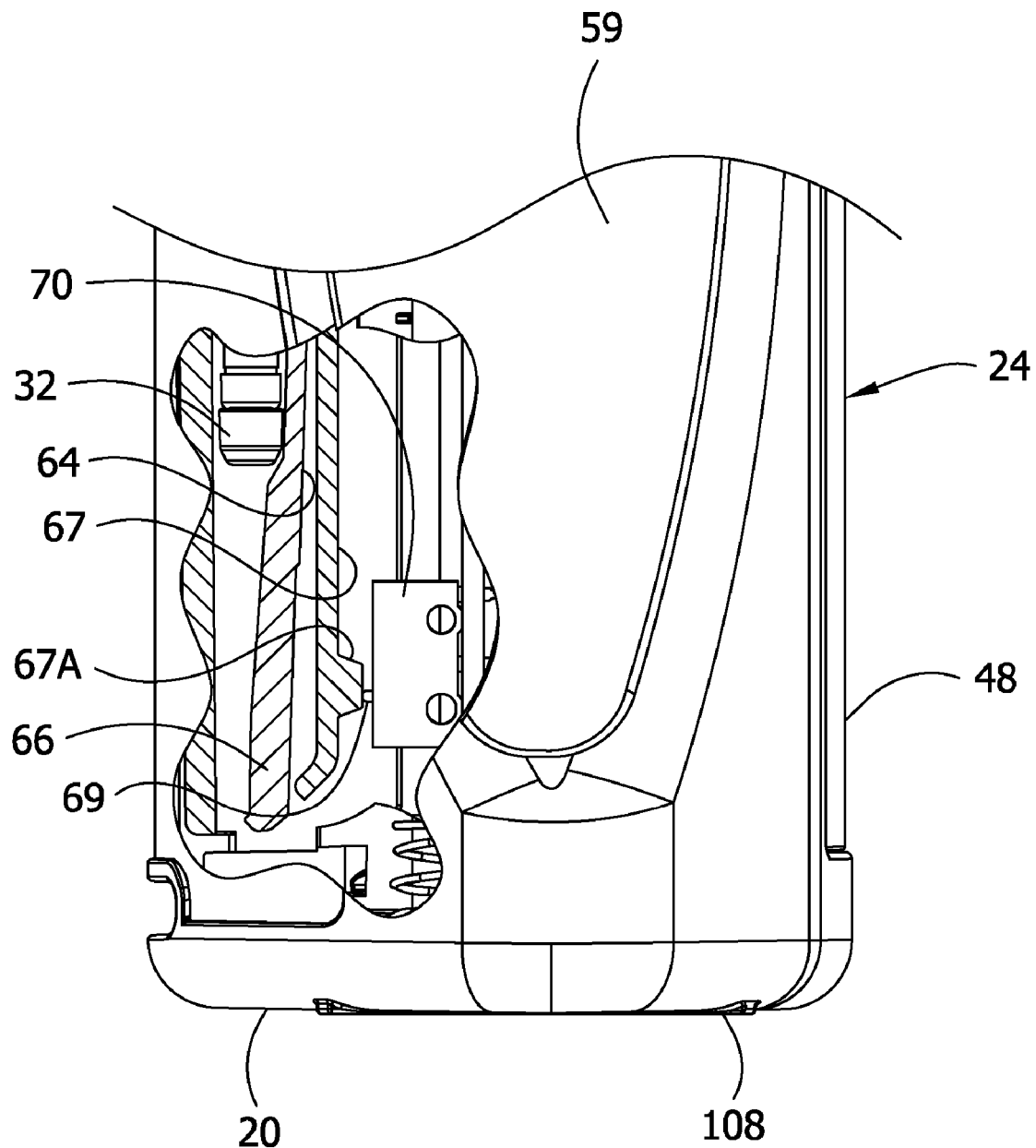
FIG. 12 is a fragmentary side elevation of the lower component of the thermometer with parts broken away to show the probe partially received in the probe well.
Figure 13:
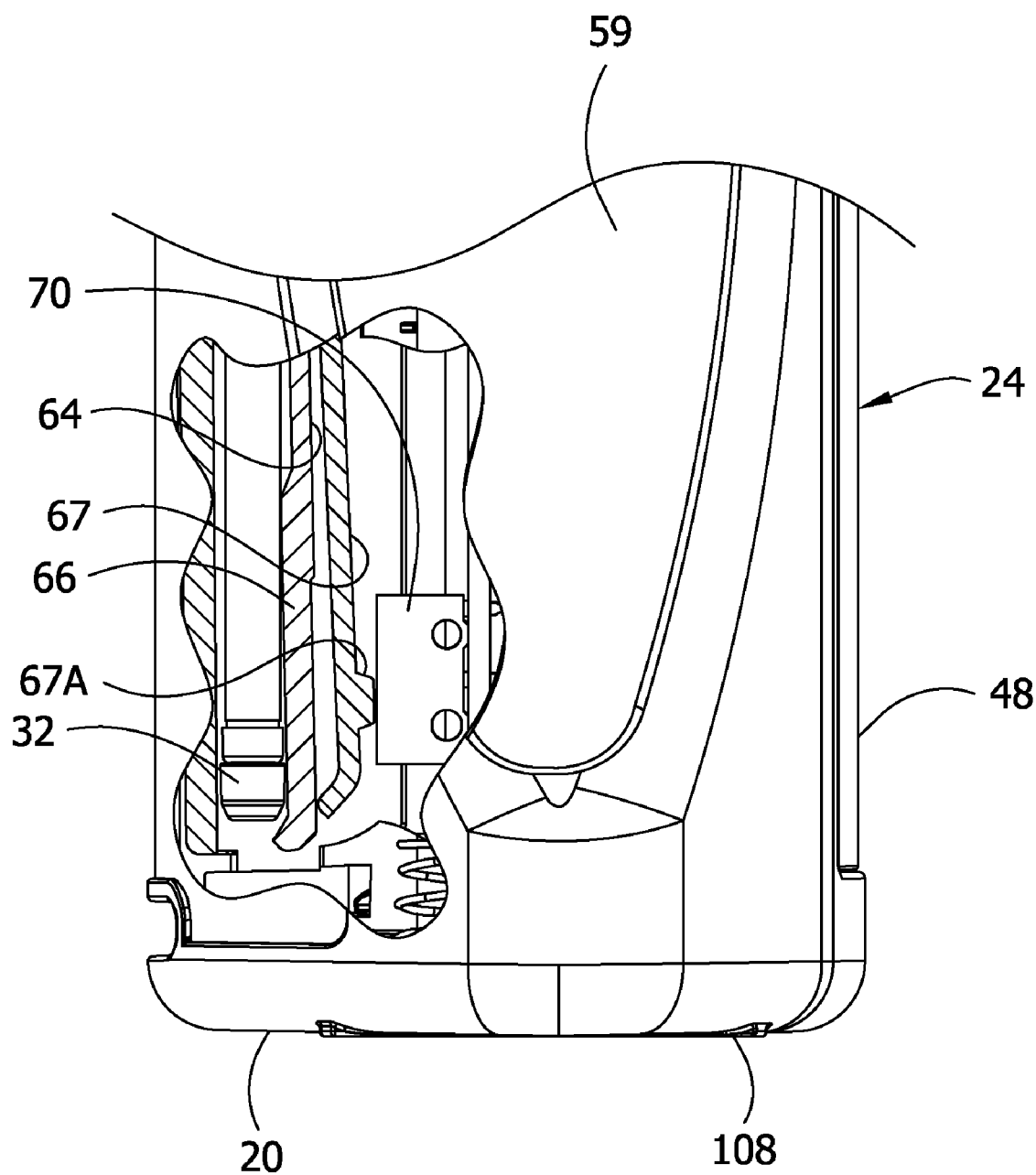
FIG. 13 is similar to FIG. 12 with the probe fully received in the probe well.

Referring to FIGS. 12 and 13, when the probe 12 is inserted in the probe well 60 (FIG. 13), the tip 32 of the probe contacts a lower portion of the tab 66, moving the tab forward so that it contacts the arm 67. The tab 66 pushes the arm 67 forward so that the projection 67A on the arm engages the actuator 69 of the switch 70, thereby configuring the thermometer 10 in the non-activated state. When the probe 12 is being removed from the well 60 (FIG. 12), the tip 32 of the probe 12 disengages the lower portion of the tab 66, whereby the tab moves back to its initial position and the projection 67A of the arm 67 disengages the actuator 69. This disengagement configures the thermometer 10 in the activated state. Other constructions for automatically switching the thermometer 10 between the activated state and the non-activated state when the probe 12 is received in and removed from the probe well 60 are within the scope of the invention.

Figure 10:
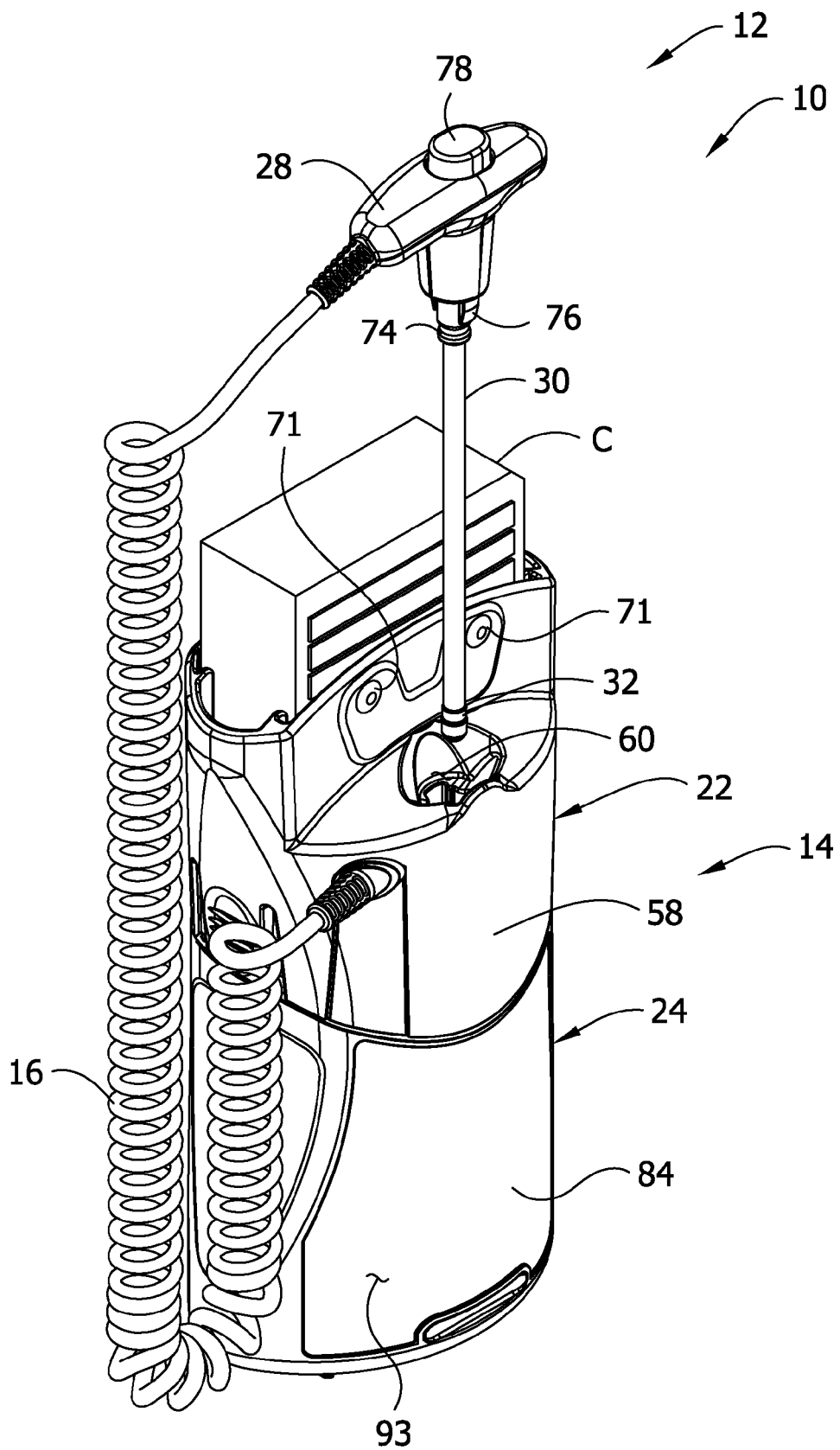
FIG. 10 is a rear perspective of the thermometer with the probe exploded from a probe well of the housing.
Figure 11:
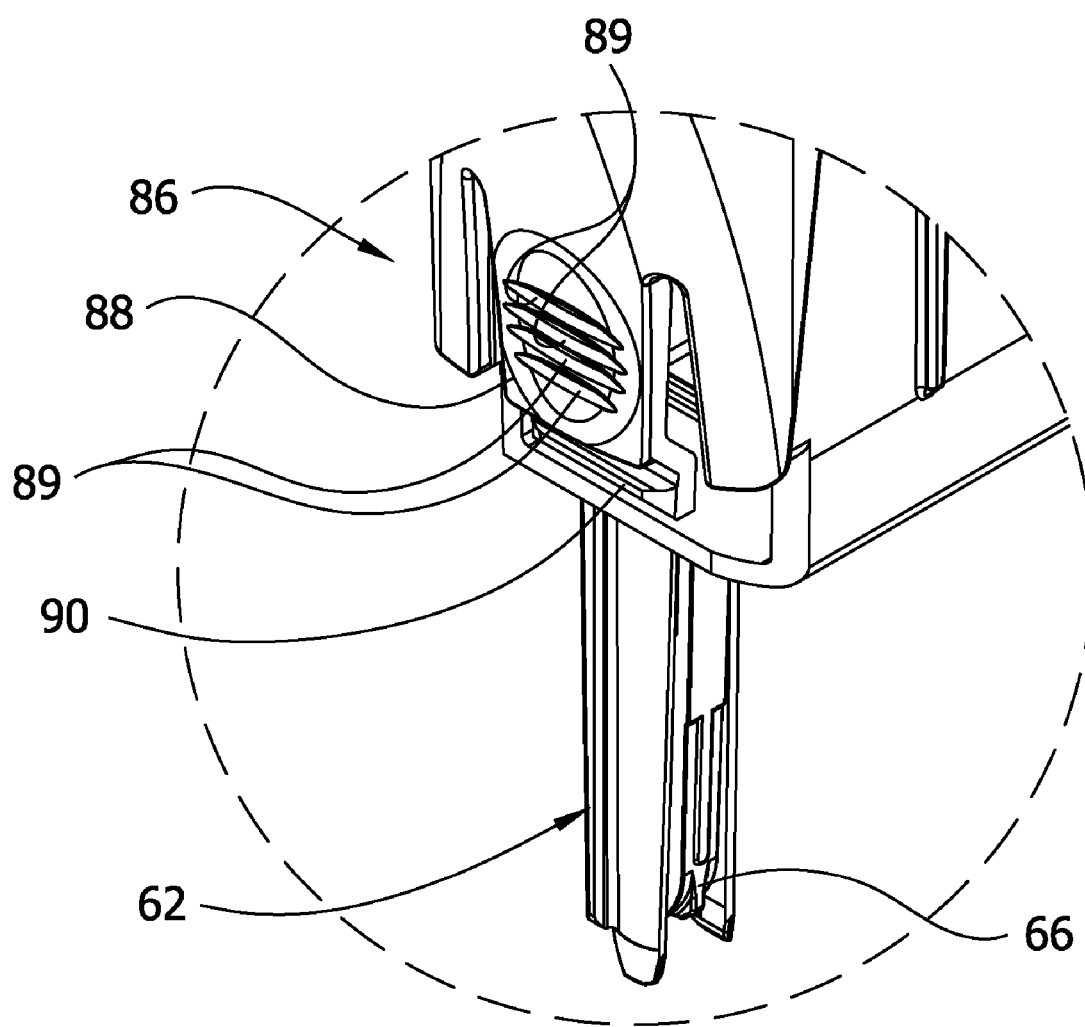
FIG. 11 is a fragment of the upper component as indicated in FIG. 5.
Figure 14:
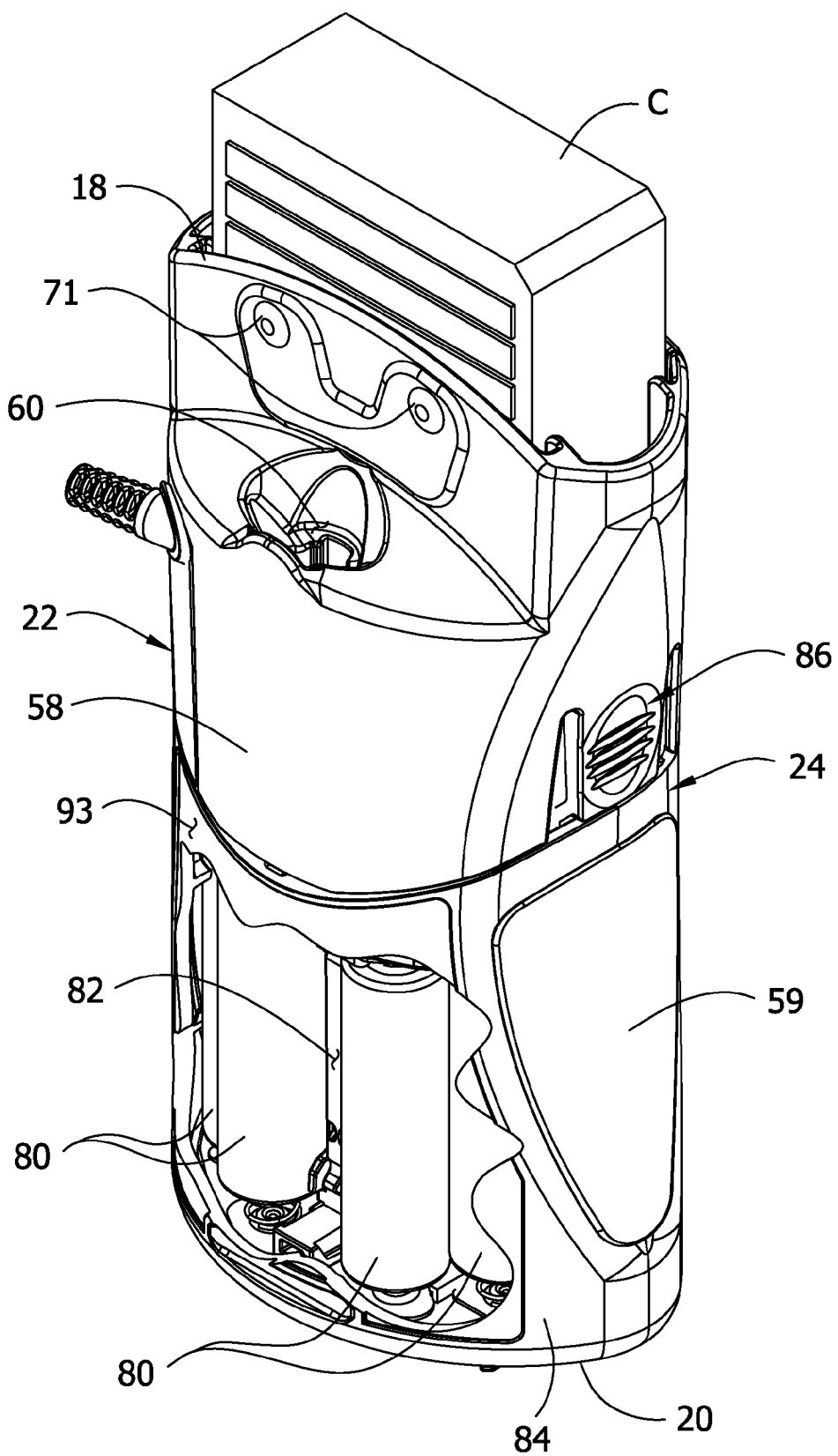
FIG. 14 is a rear perspective of the housing with the probe and the probe cord removed and parts broken away to show batteries of the thermometer.

Referring to FIGS. 9, 10 and 14, a pair of spaced apart projections 71 are disposed directly above the opening of the probe well 60 on the back side 58 of the housing 14. When the probe 12 is received the probe well 60, the projections 71 engage the handle 28 of the probe. A slight interference fit between the projections 71 and the handle 28 retains the probe 12 in the probe well 60 until sufficient upward force is applied to the probe to remove it. In this way, the projections 71 prevent unintentional or accidental removal of the probe 12 from the probe well 60, even if the thermometer 10 is inverted. Preferably, the projections 71 are elastically deformable so that the projections push the handle 28 outward from the housing 14. This force increases the frictional force between the handle 28 and the projections 71. Other ways of retaining the probe 12 in the probe well 60 are within the scope of the invention.

Figure 6:
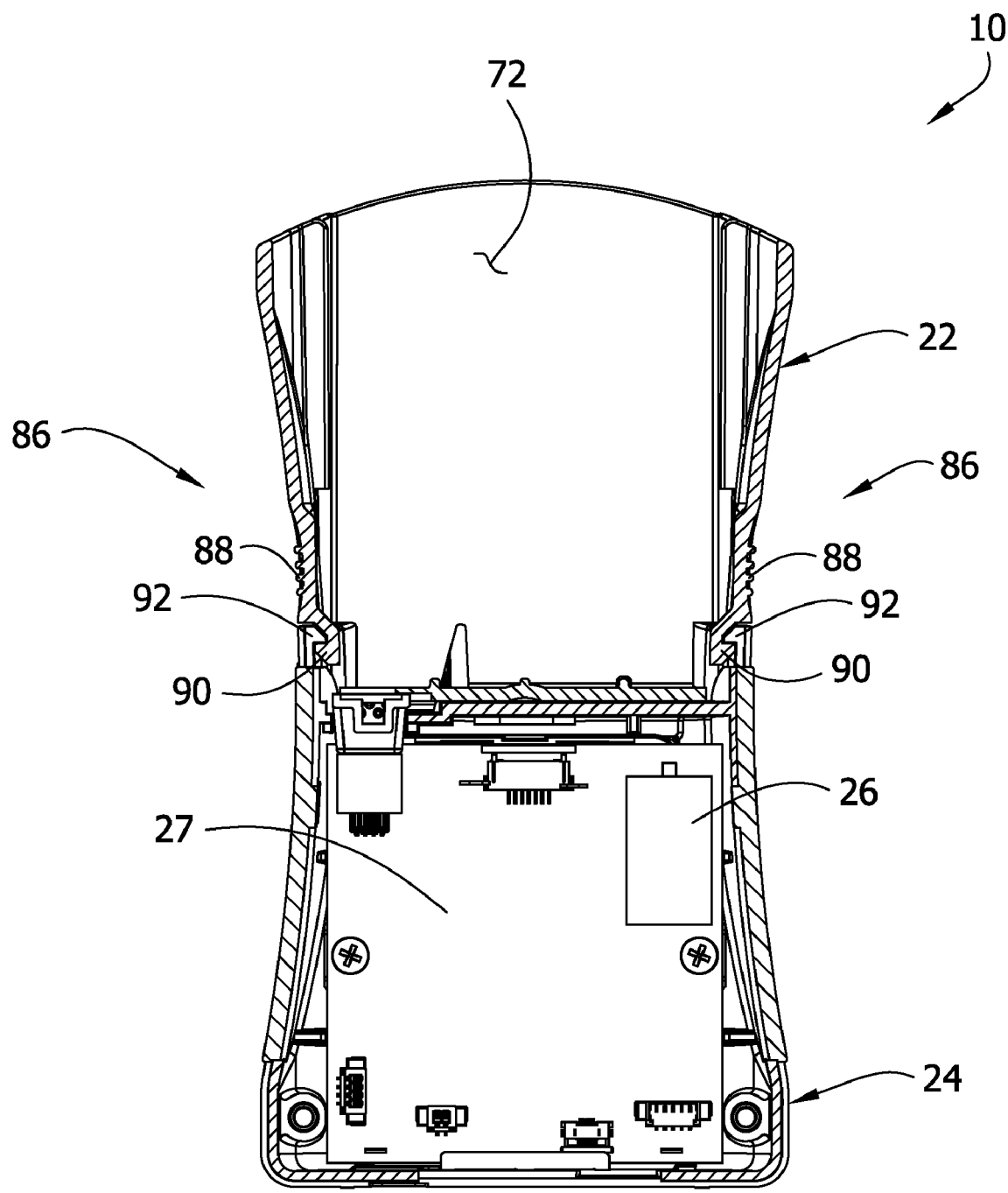
FIG. 6 is a section of the thermometer taken in the plane containing the line 6-6 of FIG. 3, with a carton of probe covers being removed for clarity.
Figure 15:
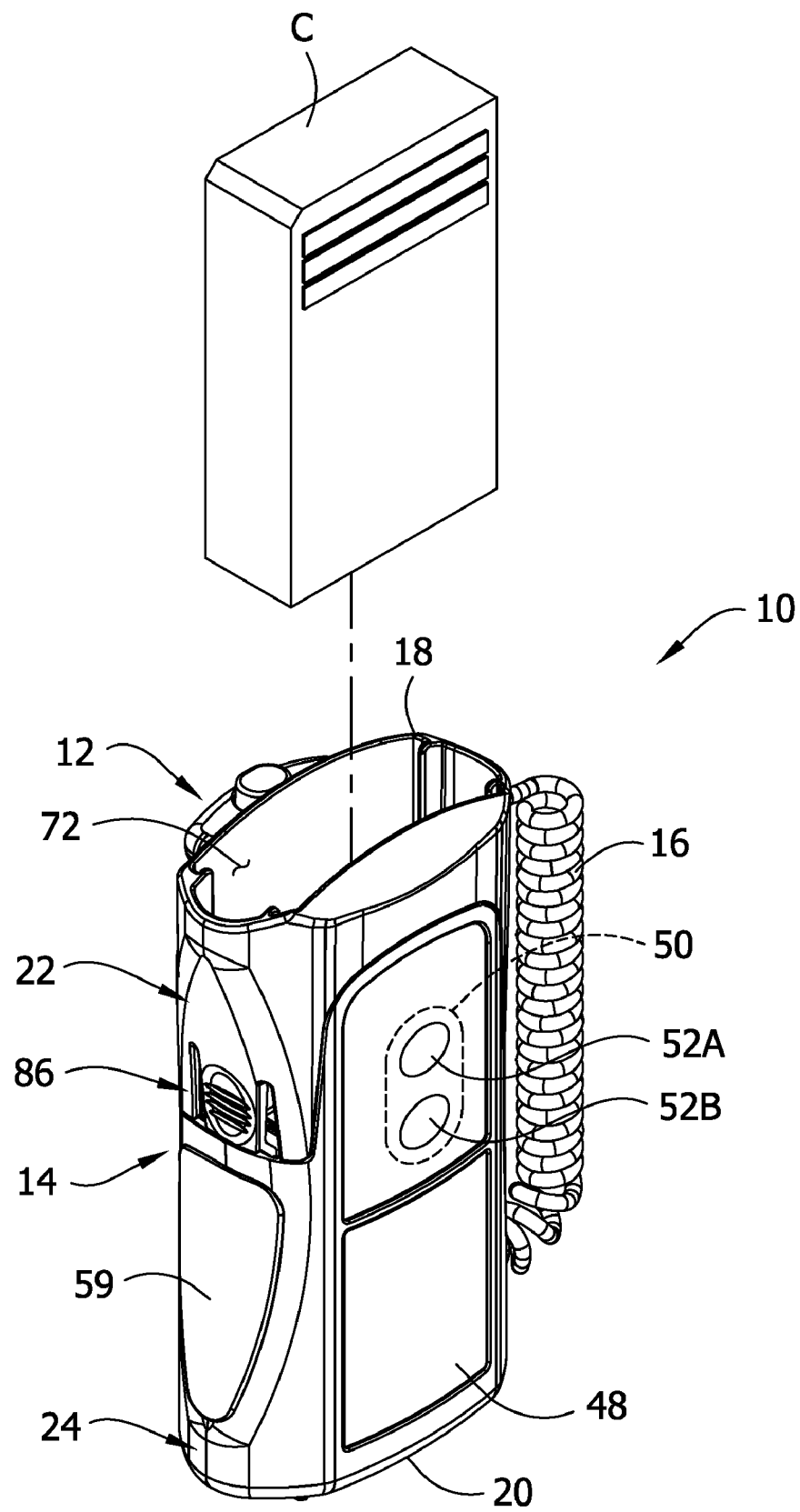
FIG. 15 is a perspective of the thermometer with the carton of probe covers exploded from a cavity of the housing.

Referring to FIGS. 6, 14 and 15, a receptacle 72 for a container C of probe covers is defined by the upper component 22 of the housing 14 and is disposed between the probe well 60 and the control panel 50 and above the LCD screen 48 and the microcontroller 26. This arrangement makes efficient use of the space offered by the design of the housing 14. In use, a top of the carton C is removed, exposing open ends of the probe covers (not shown). The probe shaft 30 can be inserted into an open end of one of the probe covers to capture (e.g., snap) the probe cover on an annular recess 74 (FIG. 7) of the probe 12. Pushers 76 are located at the junction of handle 28 of the probe 12 with the probe shaft 30. The probe shaft is protected from contamination by the cover when the probe shaft 19 is inserted, for example, into a patient's mouth. A release button 78 on the probe handle 28 can be depressed to cause the pushers 76 to move and force the probe cover out of the annular recess 74 and off the probe shaft 30. Subsequent to use, the probe cover can be discarded. Other ways of capturing and releasing probe covers may be used without departing from the scope of the present invention.

Referring to FIGS. 5, 6, 11, 14, 16 and 17, batteries 80 (e.g., four AA batteries) of the thermometer 10 (broadly, a power source) are contained within a chamber 82 defined by the lower component 24 of the housing. More specifically, the batteries 80 are held by a battery holder 83 (FIG. 17) that is secured within the chamber 82. The batteries power the microcontroller 26 and the other electrical components of the thermometer, including the thermistors 42, 44 and the heating resistor 46. The batteries 80 are accessible by disengaging the upper and lower components 22, 24, respectively, and opening a hinged door 84 of the lower component 24. Referring to FIGS. 5 and 6, the upper and lower components 22, 24, respectively, are secured together by snap-fit latches (broadly, housing latches) disposed on the lateral sides of the housing 14. The snap-fit latches 86 are of the cantilever type, including cantilevers or finger tabs 88 projecting downward from the respective sides of the upper component 22. The tabs 88 include grips 89 (FIG. 11) and have hooks 90 on their free ends that engage with corresponding hooks 92 on the lower component 24 of the housing 14 (FIG. 6). It is understood that instead of the hooks 92 on the lower component 24, recesses or groove may be defined by the lower component. To releasably secure the upper and lower components 22, 24 together, the probe well extension 62 is received in the opening 68 of the lower component and the upper and lower components are brought together so that the respective hooks 92 of the lower component engage the hooks 90 of the snap-fit latches 86. To disassemble the housing 14, the tabs 88 are simultaneously pressed inward, toward the center of the housing 14, such as by squeezing the tabs at the grips 89 between one's fingers and thumb, thereby deflecting the tabs and disengaging the hooks 90 from the hooks 92. With the snap-fit latches 86 disengaged, the upper component 22 may be removed from the lower component 24. It is understood that other ways of releasably securing the upper and lower components are within the scope of the invention.

Figure 16:
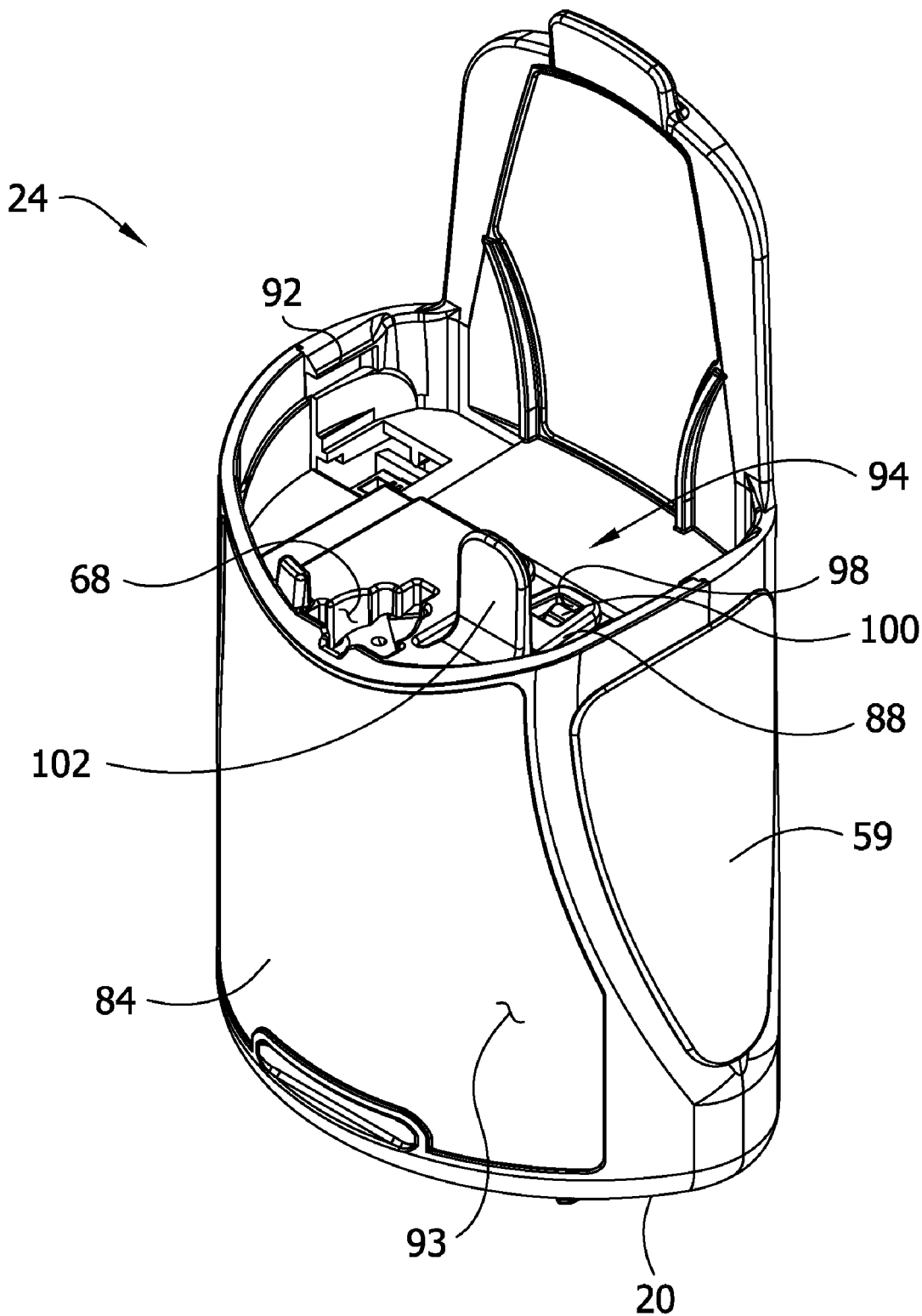
FIG. 16 is a rear perspective of the lower component of the housing.
Figure 17:
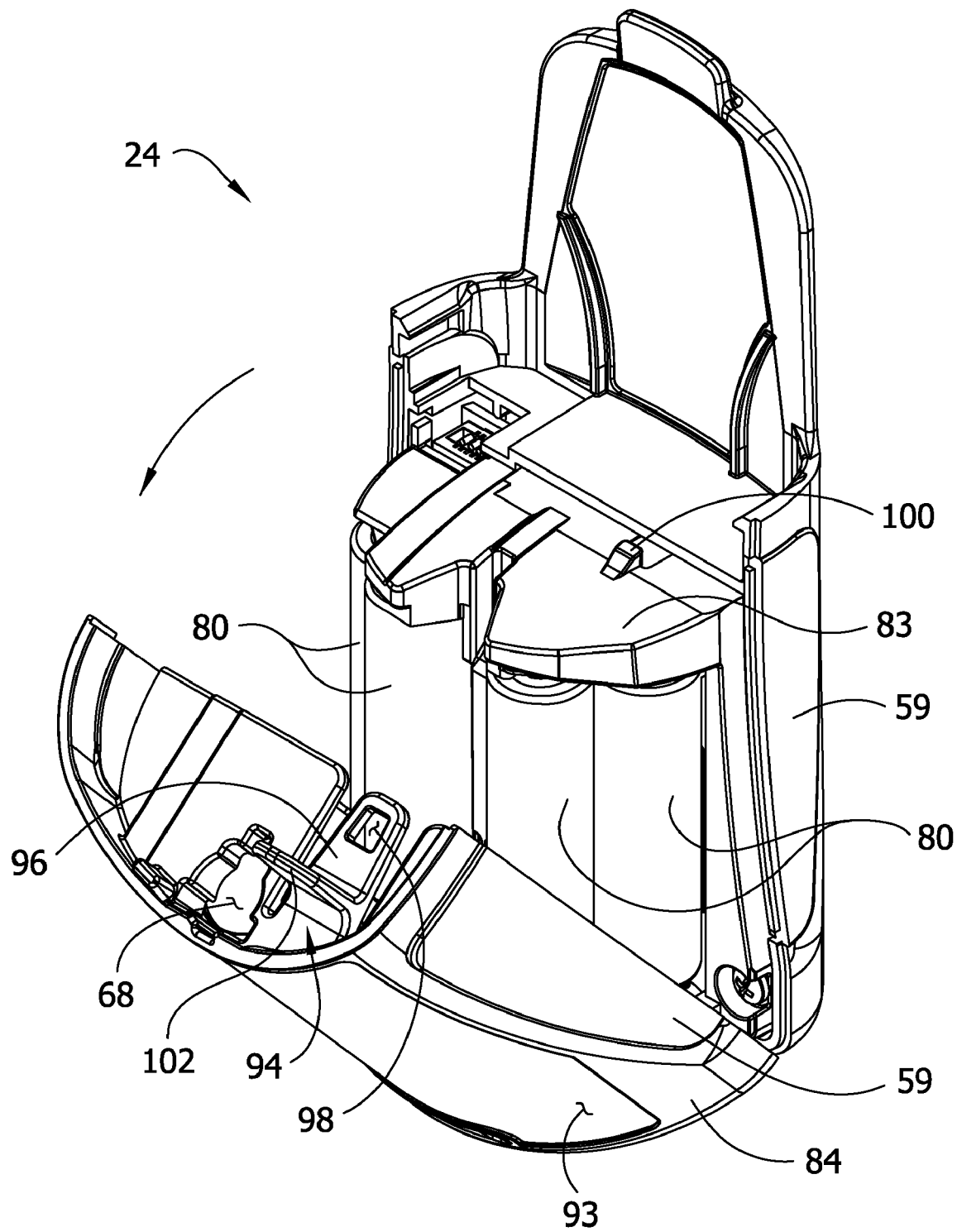
FIG. 17 is similar to FIG. 16 with a door of the lower component open.

As shown in FIGS. 16-19, the door 84 of the battery chamber 82 corresponds to a rear portion of the lower component 24 and is pivotally secured to a front portion of the lower component adjacent to the bottom 20 of the housing, i.e., the lower component 24. A portion 93 of the door 84 is recessed for receiving a sticker with instructions or other decals. The door 84 is secured to a top of the battery holder 83 by a snap-fit latch 94 (broadly, a door latch), which is of the cantilever type. A cantilever 96 or finger associated with door 84 includes an opening 98 at its free end for receiving a catch 100 projecting upward from the battery holder 83. The catch 100 engages the cantilever 96 to secure the latch 94 (FIG. 16). The user may release the latch 94 by deflecting the cantilever 96 using a tab 102 projecting upward from the cantilever so that the catch 100 is released from the opening 98 and the hook disengages the cantilever. More specifically, the user may push backward on the tab 102 toward the back side 58 of the housing 14, thereby deflecting the cantilever 96 upward to release the latch 94. The catch 100 has an inclined surface that engages and deflects the cantilever 96 as the door 84 is closed. Thus, the catch 100 can be snapped into the opening 98 in the cantilever 96 without manipulating the tab 102.

The door 84 is secured at its bottom by a pivot tab 104 (FIGS. 18 and 19) projecting rearward from the door. This tab is sized and shaped to be received in a slot 106 (FIG. 19) defined by a recessed bottom of the battery holder 83 and the bottom 20 of the front side of the lower component 24. As explained in more detail below, the tab 104 acts as a pivot point of the door 84. The tab 104 is generally L-shaped and is trapped in the slot 106 between the battery holder 83 and the bottom 20 of the front side of the lower component 24 when the door 84 is secured to the lower component 24 so that the door cannot be pulled rearward at its bottom and removed from the lower component when the door is closed.

Figure 18:
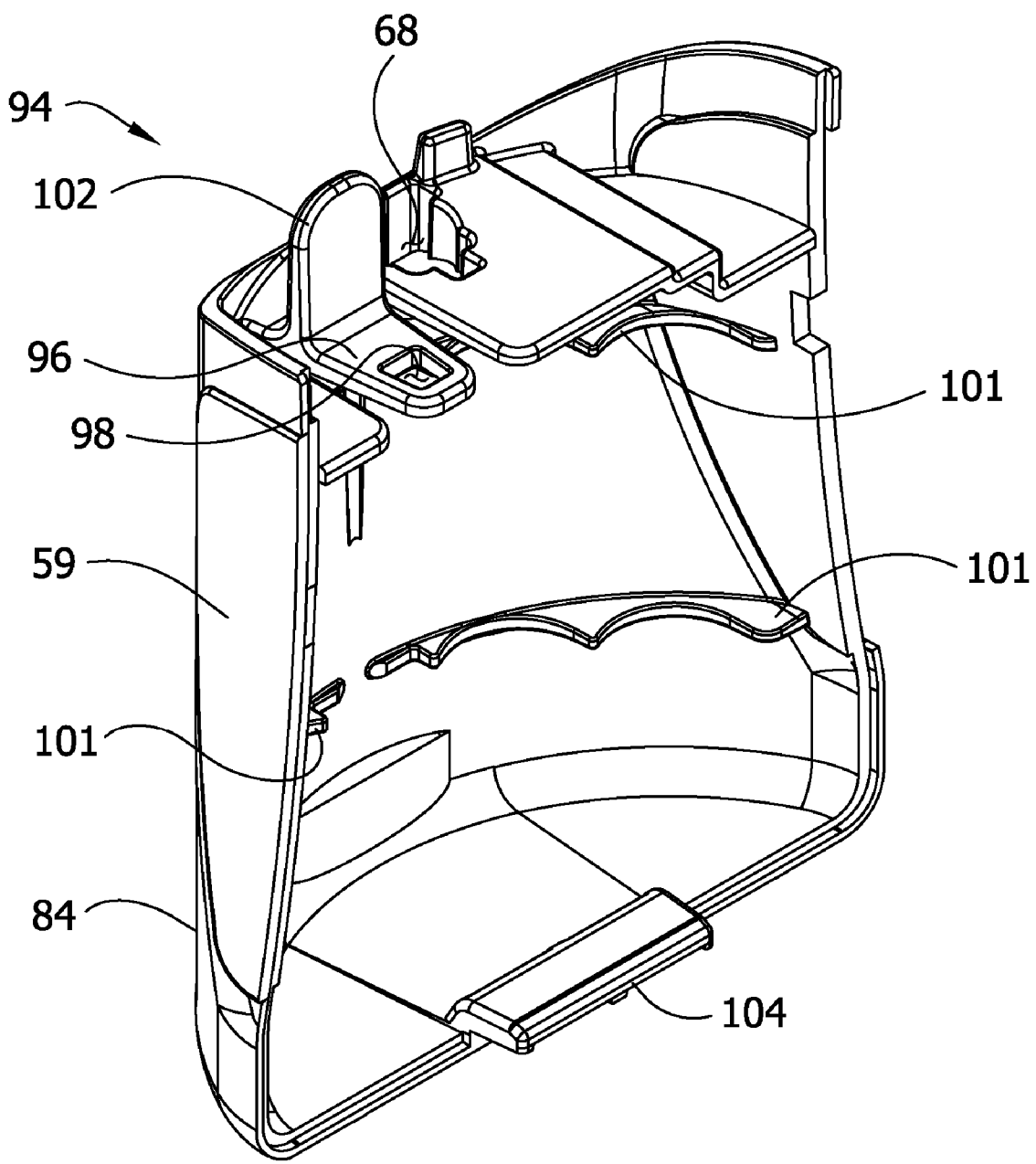
FIG. 18 is a perspective of the door.
Figure 19:
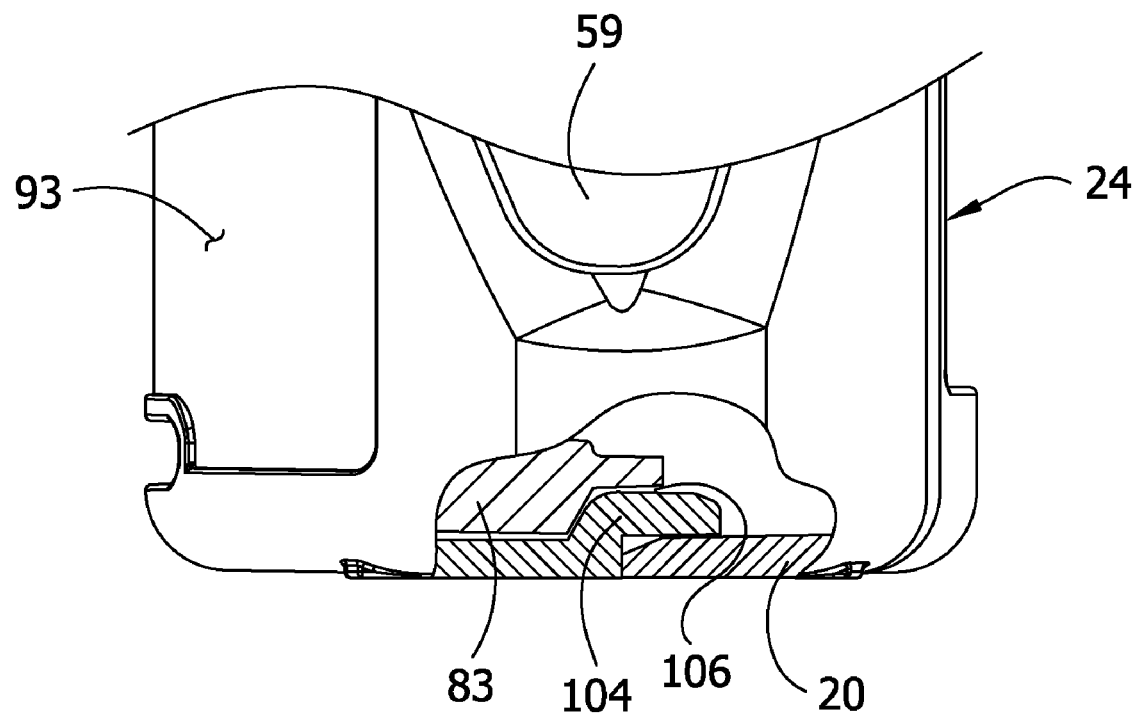
FIG. 19 is a fragmentary side elevation of the lower component with parts broken away to show securement of the door to the lower component.

When the upper component 22 is secured to the lower component 24, the probe well extension 62 is received in the opening 68 of the lower component 24 (more specifically, the opening is in an upper surface of the door 84) thereby preventing the door from opening when the upper component is secured to the lower component (FIG. 5). Moreover, the door latch 94 is concealed by the upper component 22 and the tab 102 is received in a recess (not shown) of the upper component. The upper component blocks access to the tab 102 for moving it backward and prevents the cantilever 96 from lifting upward and disengaging the catch 100. The batteries 80 are held by the battery holder 83 and by brackets 101 on the interior of the door 84 (FIG. 18). Once the upper component 22 is removed from the lower component 24, the probe well extension 62 is removed from the door 84 and the lower component 24, and the door latch 94 is accessible to the user and the cantilever 96 may be deflected upward to unsecure the latch 94 and open the door 84. This configuration ensures that the door latch 94 will not become unsecured unintentionally and the chamber door 84 will not accidentally open. After the latch 94 is released, the user must continue to pivot the door 84 about the pivot tab 104 until the tab disengages the battery holder 83 and can slide out of the slot 106. At this point, the door 84 may be completely removed from the lower component 24. To secure the door 84 on the lower component 24, the pivot tab 104 must first be inserted into the slot 106, and the door must be pivoted upward until the opening 98 of the cantilever 96 receives the catch 100.

Other configurations of the door latch and other ways of securing the door to the housing are within the scope of the invention.

Figure 20:
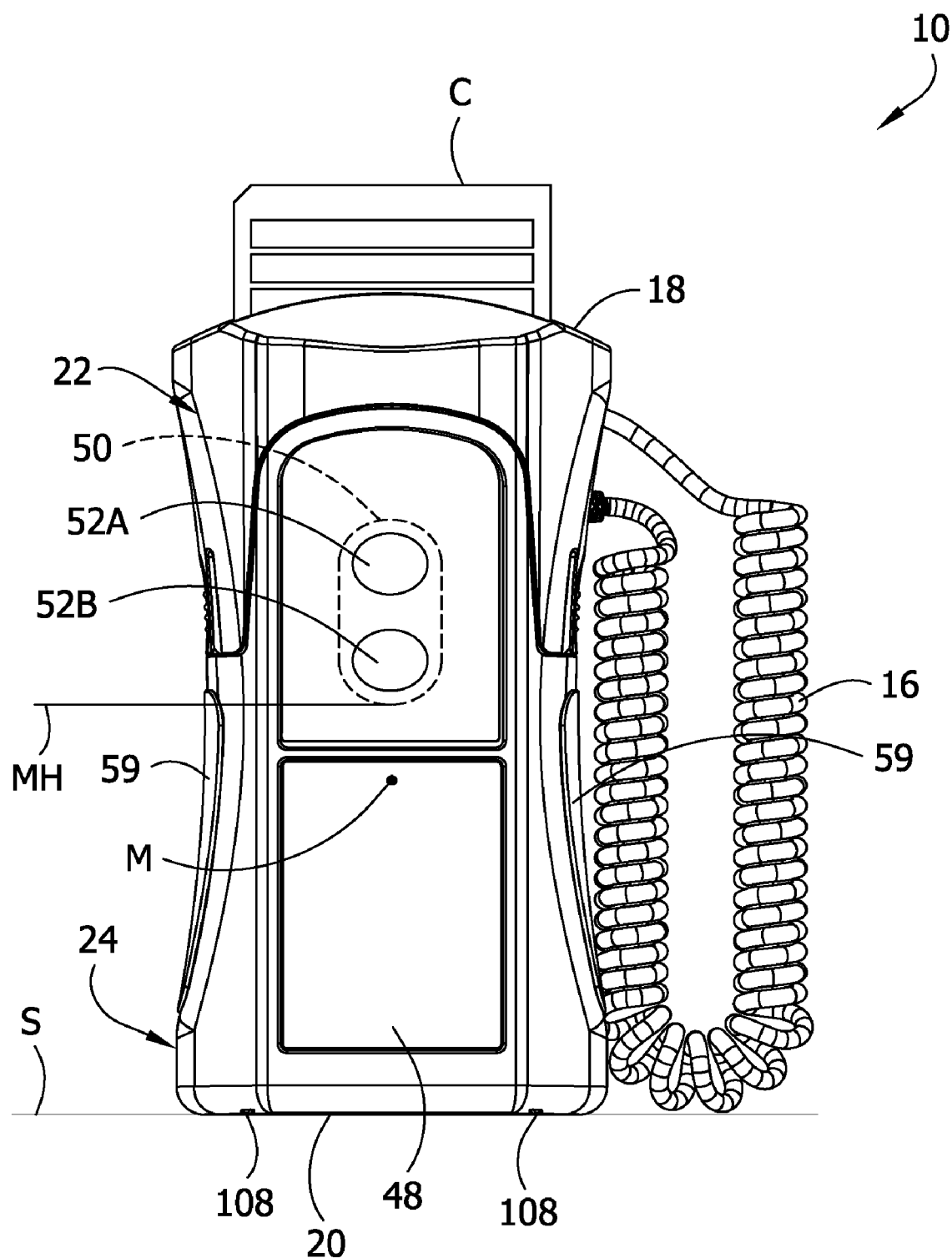
FIG. 20 is a front elevation of the thermometer standing upright on a planar surface.

Referring to FIGS. 20 and 21, the thermometer 10 is also configured to stand upright when placed on a generally planar surface S. The bottom 20 of the housing 14 is generally planar and includes spaced apart elongate feet 108 running from adjacent the front side of the housing to adjacent the backside. The thermometer 10 has a center of mass M that is below the mid-height MH of the thermometer 10. Thus, the thermometer 12 is not top-heavy and is more likely to remain upright when a tipping force is applied to it than if the thermometer was top-heavy. Standing the thermometer 12 upright, instead of laying the thermometer on one of its side (e.g., its front side or its back side), ensures that the probe covers in the probe cover box C will remain in box and will not slide out. The probe covers are likely to be contaminated if they slide out of the box C.

Having described embodiments of the invention in detail, it will be apparent that modifications and variations are possible without departing from the scope of the invention defined in the appended claims.

When introducing elements of the present invention or embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A hand-held electronic thermometer comprising:
a temperature sensing component;
a housing having a top, a bottom and a height that extends generally transverse to lengths of a user's fingers when being held in a hand of a user,
a microcontroller in the housing in communication with the temperature sensing component, a display on the housing in communication with the microcontroller and capable of displaying a temperature detected by the temperature sensing component, and a control panel on the housing being defined by at least one input interface device in communication with the microcontroller for operating the thermometer, the control panel being disposed above the display screen so that a user may hold the base unit with one hand and a thumb of the hand is naturally positioned adjacent to the interface device to allow the user to quickly access the interface device with the thumb without substantially blocking the display screen.

2. An electronic thermometer as set forth in claim 1 wherein the housing has a mid-height disposed midway between the top and the bottom of the housing, at least a portion of the display screen being disposed below the mid-height of the housing.

3. An electronic thermometer as set forth in claim 2 wherein at least a majority portion of the display screen is disposed below the mid-height of the housing.

4. An electronic thermometer as set forth in claim 3 wherein an entirety of the display screen is disposed below the mid-height of the housing.

5. An electronic thermometer as set forth in claim 3 wherein at least a majority of the control panel is disposed above the mid-height of the housing.

6. An electronic thermometer as set forth in claim 1 wherein the display screen and the control panel are disposed on a front side of the housing, and wherein the housing has opposite lateral sides, each lateral side having a height corresponding to the height of the housing and a width transverse of the height, each lateral side being generally concave along its height and generally convex along its width for improving grip by the user.

7. An electronic thermometer as set forth in claim 1 wherein the housing has a mid-height disposed midway between the top and the bottom surfaces of the housing, the thermometer having a center of mass below the mid-height of the housing.

8. An electronic thermometer as set forth in claim 1 wherein the thermometer further comprises a probe supporting the temperature sensing component, and the housing further includes a probe well at its back side behind the receptacle for receiving the probe, the probe well being disposed a distance below the top of the housing so that when the probe is seated in the probe well an entirely of the probe is disposed below the top of the housing, whereby the probe is shielded by the housing.

9. An electronic thermometer as set forth in claim 8 wherein the housing has a front side and a back side, the display screen and the control panel being disposed on the front side of the housing, the housing defining a receptacle disposed generally between the control panel and the probe well having an opening through the top of the housing between the front side and the backside and being sized and shaped for receiving a container of probe covers.

10. An electronic thermometer as set forth in claim 2 wherein the bottom of the thermometer is constructed to hold the thermometer upright when placed on a supporting surface.

11. An electronic thermometer as set forth in claim 1 wherein the housing includes an upper component and a lower component that are releasably secured together to form the housing, the lower component including a compartment for a removable power supply and a door on the lower component adapted to be opened for accessing the compartment.

12. An electronic thermometer as set forth in claim 11 wherein the housing further comprises a door latch for releasably securing the door to the lower component, wherein the latch is disposed on the housing so that when the upper and lower components are secured together the latch is disposed under the upper component and the upper component must be removed from the lower component to access the latch.

13. An electronic thermometer as set forth in claim 12 wherein the upper component includes a probe well for holding a probe and a probe well extension extending downward from a bottom of the upper component, and engageable with the door when the upper and lower components are secured together to prevent the door from opening when the upper and lower components are secured together.

14. An electronic thermometer as set forth in claim 13 wherein the housing further comprises a pair of lateral latches disposed on opposite lateral sides of the housing for releasably securing the upper component to the lower component.

15. An electronic thermometer as set forth in claim 14 wherein the door latch and the lateral latches comprise snap-fit latches.

16. An electronic thermometer as set forth in claim 1 further comprising an elongate probe secured to the housing by a helical cord, the sensing component being disposed in the probe.

17. An electronic thermometer as set forth in claim 16 further comprising a probe well in the housing on the back side for holding the probe and at least one projection on the back side of the housing generally adjacent to an opening of the probe well for engaging a handle of the probe when the probe is received in the probe well to prevent unintentionally removal of the probe from the probe well.

18. An electronic thermometer as set forth in claim 17 wherein the at least one projection is elastically deformable.

19. An electronic thermometer as set forth in claim 18 wherein the at least one projection comprises a pair of spaced apart rounded projections.

20. A hand-held electronic thermometer comprising:
a probe including at least one temperature sensing component disposed within the probe;
a housing having a front side and a back side, a top and a bottom, and a height that extends generally transverse to lengths of a user's fingers when being held in a hand of a user,
a microcontroller in the housing in communication with the temperature sensing component of the probe,
a display on the housing in communication with the microcontroller and capable of displaying a temperature detected by the temperature sensing component,
a probe well in the housing on the back side of the housing sized and shaped to receive the probe, the probe well being disposed a distance below the top of the housing so that when the probe is seated in the probe well an entirety of the probe is disposed below the top of the housing, whereby the probe is shielded by the housing.

21. An electronic thermometer as set forth in claim 20 wherein the housing has opposite lateral sides, each lateral side having a height corresponding to the height of the housing and a width transverse of the height, each lateral side being generally concave along its height and generally convex along its width for improving grip by the user.

22. An electronic thermometer as set forth in claim 21 wherein the housing has a mid-height disposed midway between the top and the bottom of the housing, at least a portion of the display being disposed below the mid-height of the housing.

23. An electronic thermometer as set forth in claim 22 wherein at least a majority portion of the display screen is disposed below the mid-height of the housing.

24. An electronic thermometer as set forth in claim 23 wherein an entirety of the display screen is disposed below the mid-height of the housing.

25. An electronic thermometer as set forth in claim 24 wherein at least a majority of the control panel is disposed about the mid-height of the housing.

26. An electronic thermometer as set forth in claim 21 wherein the bottom of the thermometer is constructed to hold the thermometer upright when placed on a supporting surface.

27. An electronic thermometer as set forth in claim 26 wherein the thermometer has a center of mass generally adjacent to the mid-height of the housing.

28. A hand-held electronic thermometer comprising
a temperature sensing component;
a housing having a front side and a back side, a top and a bottom, and a height that extends generally transverse to lengths of a user's fingers when being held in a hand of a user, the housing comprises an upper component and a lower component adapted to be releasably secured together,
a microcontroller in the housing in communication with the temperature sensing component of the probe,
a display screen on the front of the housing capable of displaying a temperature detected by the temperature sensing component,
a compartment in the lower component of the housing for containing a source of power for operating the thermometer,
a door on the back side of the lower component of the housing for accessing the compartment, the upper and lower components being configured to prevent the door from opening when the upper and lower components are secured together.

29. An electronic thermometer as set forth in claim 28 wherein the upper component includes a probe well for holding a probe and a probe well extension extending downward from a bottom of the upper component, and engageable with the door when the upper and lower components are secured together to prevent the door from opening when the upper and lower components are secured together.

30. An electronic thermometer as set forth in claim 29 wherein the door is releasably secured to the lower component by a door latch, and wherein the upper and lower components are constructed so that when the components are secured together, the upper component blocks access to the latch for the door and the upper component and the upper component must be removed from the lower component to access the latch for releasing the latch.

31. An electronic thermometer as set forth in claim 30 wherein the housing further comprises a pair of housing latches on opposite lateral sides of the housing for releasably securing the upper and lower components together.

32. A hand-held electronic thermometer comprising
a probe including a temperature sensing component;
an elongate housing having a top, a bottom and a height that extends generally transverse to the length of a user's fingers when being held in a hand of the user, the bottom of the housing being formed to hold the housing in an upright position when the bottom is placed in engagement with a horizontal support surface;
a microcontroller in the housing in communication with the temperature sensing component of the probe,
a display on the housing in communication with the microcontroller and capable of displaying a temperature detected by the temperature sensing component.

33. An electronic thermometer as set forth in claim 32 the housing has a mid-height disposed midway between the top and the bottom of the housing, the center of mass being disposed below the mid-height.

34. An electronic thermometer as set forth in claim 32 wherein the housing comprises an upper component and a lower component, the lower component having a battery chamber therein.

35. An electronic thermometer as set forth in claim 32 wherein the display is located on the lower component.

36. An electronic thermometer as set forth in claim 32 wherein the bottom of the housing is substantially flat.

37. An electronic thermometer as set forth in claim 36 wherein the housing comprises feet for engaging the horizontal support surface and holding the housing in an upright position thereon.

38. An electronic thermometer as set forth in claim 37 wherein the feet are elongate and extending in a direction generally between front and back sides of the housing.

39. A hand-held electronic thermometer comprising:
a temperature sensing component;
a housing having a top, a bottom and a height that extends generally transverse to lengths of a user's fingers when being held in a hand of a user;
a microcontroller in the housing in communication with the temperature sensing component;
a display on the housing in communication with the microcontroller and capable of displaying a temperature detected by the temperature sensing component;
the housing having a generally hourglass shape for gripping and retaining the thermometer in the hand.

40. An electronic thermometer as set forth in claim 39 wherein the display screen and the control panel are disposed on a front side of the housing, and wherein the housing has opposite lateral sides, each lateral side having a height corresponding to the height of the housing and a width transverse of the height, each lateral side being generally concave along its height and generally convex along its width for improving grip by the user.

* * * * *

UNITED STATES PATENT AND TRADEMARK OFFICE
CERTIFICATE OF CORRECTION

| | | |
|---|---|---|
| PATENT NO. | : 7,654,735 B2 | Page 1 of 1 |
| APPLICATION NO. | : 11/539516 | |
| DATED | : February 2, 2010 | |
| INVENTOR(S) | : Sisk et al. | |

It is certified that error appears in the above-identified patent and that said Letters Patent is hereby corrected as shown below:

Title page, item (*) Notice:   should read as follows:   Subject to any disclaimer, the term of this patent is extended or adjusted under 35 U.S.C. 154(b) by 390 days.

Title page, item [74] insert the following:

--Attorney, Agent or Firm - Edward S. Jarmolowicz, Esq.

Signed and Sealed this

Seventeenth Day of August, 2010

David J. Kappos
*Director of the United States Patent and Trademark Office*